United States Patent
Sindhagatta Krishnappa et al.

(10) Patent No.: US 11,533,428 B2
(45) Date of Patent: Dec. 20, 2022

(54) ELECTRONIC DEVICE AND METHOD FOR CONTROLLING ELECTRONIC DEVICE

(71) Applicant: Samsung Electronics Co., Ltd., Suwon-si (KR)

(72) Inventors: Pradeep Kumar Sindhagatta Krishnappa, Bengaluru (IN); Rakshit Shukla, Bengaluru (IN); Ishu Jain, Bengaluru (IN); Srinivas Reddy Eregala, Bengaluru (IN); Divakar Verma, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/141,577

(22) Filed: Jan. 5, 2021

(65) Prior Publication Data
US 2021/0235012 A1    Jul. 29, 2021

(30) Foreign Application Priority Data

Jan. 23, 2020  (IN) .............................. 202041003084
Sep. 14, 2020  (IN) .............................. 202041039808
(Continued)

(51) Int. Cl.
H04N 5/232    (2006.01)
H04N 5/262    (2006.01)
(Continued)

(52) U.S. Cl.
CPC ......... *H04N 5/23232* (2013.01); *G06T 7/215* (2017.01); *H04N 5/144* (2013.01);
(Continued)

(58) Field of Classification Search
CPC .......... G06T 2207/10016; G06T 7/215; H04N 5/144; H04N 5/23216; H04N 5/23218;
(Continued)

(56) References Cited

U.S. PATENT DOCUMENTS 6,842,196 B1 *  1/2005  Swift ................. H04N 5/23267
                                                     348/451
8,682,134 B2    3/2014  Otani
(Continued)

FOREIGN PATENT DOCUMENTS

CN    105812853 A    7/2016
CN    110580708 A    12/2019
(Continued)

OTHER PUBLICATIONS

Written Opinion of the International Searching Authority (PCT/ISA/237) and International Search Report (PCT/ISA/210) dated Apr. 8, 2021, in corresponding International Patent Application No. PCT/KR2021/000177.
(Continued)

*Primary Examiner* — Amy R Hsu
(74) *Attorney, Agent, or Firm* — Staas & Halsey LLP

(57) ABSTRACT

An electronic device and a controlling method thereof are provided. The electronic device includes a memory, a first camera including a first image sensor and at least one processor, and the at least one processor obtains a plurality of image frames by photographing surroundings of the electronic device through the first camera, sets a region of interest (ROI) on the plurality of image frames, obtains a motion identification map corresponding to each of the plurality of image frames and select at least one image frame from among the plurality of image frames based on the obtained motion identification map, identifies whether there is a motion of an object on the ROI set on the selected at least one image frame, and performs a Super Slow Motion (SSM) function through the first camera based on a result of the identification.

20 Claims, 33 Drawing Sheets

(30) Foreign Application Priority Data

Sep. 15, 2020 (IN) ............................ 202041003084
Nov. 13, 2020 (KR) ........................ 10-2020-0152072

(51) Int. Cl.
  *H04N 5/247* (2006.01)
  *H04N 5/268* (2006.01)
  *G06T 7/215* (2017.01)
  *H04N 5/14* (2006.01)

(52) U.S. Cl.
  CPC ......... *H04N 5/23218* (2018.08); *H04N 5/247* (2013.01); *H04N 5/268* (2013.01); *H04N 5/2621* (2013.01)

(58) Field of Classification Search
  CPC ........... H04N 5/23232; H04N 5/23254; H04N 5/232933; H04N 5/232945; H04N 5/247; H04N 5/2621; H04N 5/2625; H04N 5/268
  See application file for complete search history.

(56) References Cited

U.S. PATENT DOCUMENTS

| | | | |
|---|---|---|---|
| 9,405,970 B2 | 8/2016 | Israel et al. | |
| 9,667,980 B2 | 5/2017 | Wang et al. | |
| 2005/0276446 A1 | 12/2005 | Chen et al. | |
| 2009/0066790 A1 | 3/2009 | Hammadou | |
| 2010/0265344 A1 | 10/2010 | Velarde et al. | |
| 2012/0069897 A1* | 3/2012 | Anselmo ................ | H04N 19/80 348/700 |
| 2013/0004096 A1* | 1/2013 | Goh ....................... | H04N 19/80 382/260 |
| 2013/0114703 A1 | 5/2013 | DeForest et al. | |
| 2015/0256749 A1 | 9/2015 | Frey et al. | |
| 2017/0314930 A1* | 11/2017 | Monterroza .......... | G06N 3/049 |
| 2018/0035075 A1* | 2/2018 | Lee ......................... | G11B 27/34 |
| 2018/0139467 A1* | 5/2018 | Lee ......................... | G06T 7/246 |
| 2018/0359455 A1 | 12/2018 | Kuriyama | |
| 2018/0376067 A1* | 12/2018 | Martineau .............. | H04N 5/232 |
| 2019/0260914 A1 | 8/2019 | Kim et al. | |

FOREIGN PATENT DOCUMENTS

| | | |
|---|---|---|
| EP | 2 202 748 B1 | 7/2013 |
| KR | 10-2014-0100151 A | 8/2014 |
| WO | WO 2005/124709 A2 | 12/2005 |
| WO | WO 2018/071046 A1 | 4/2018 |
| WO | WO 2018/226203 A1 | 12/2018 |
| WO | WO 2019/204969 A1 | 10/2019 |

OTHER PUBLICATIONS

Examination Report dated Dec. 1, 2021 issued by the Indian Patent Office for Indian Patent Application No. 202041003084.
European Search Report dated Oct. 18, 2022, issued in European Patent Application No. 21744256.5.

* cited by examiner

Position H

ELECTRONIC DEVICE AND METHOD FOR CONTROLLING ELECTRONIC DEVICE

CROSS-REFERENCE TO RELATED APPLICATIONS

This application claims the benefit of India Provisional Specification Application No. 202041003084 filed Jan. 23, 2020, India Provisional Specification Application No. 202041039808 filed Sep. 14, 2020, India Complete Specification Application No. 202041003084 filed Sep. 15, 2020, and Korean Patent Application No. 10-2020-0152072 filed Nov. 13, 2020, all of which are incorporated herein by reference in their entireties.

FIELD

This disclosure relates to an electronic device and a method for controlling the electronic device, and more particularly, to an electronic device that triggers a Super Slow Motion (SSM) function automatically and a controlling method thereof.

DESCRIPTION OF THE RELATED ART

An SSM video is generally captured for recording high-speed motions in a scene. A frame rate of image capturing is very high for example 480 Frames Per Second (fps), 960 fps, etc. for generating the SSM video. A large amount of computational resources, storage resources, and electric power is consumed to generate the SSM video with a time duration of just 1 minute. It is preferred to generate the SSM video of only a relevant event in a scene with a small-time duration. A user can manually activate SSM video recording only when needed to record the relevant event in the scene. Such a manual activation of the SSM video recording implies a possibility that the user may activate the SSM video recording early or late due to fast movements in the scene which is not being expected by the user. Hence, the user may miss to capture the SSM video of the relevant event in the scene or size of the SSM video may be of very large due to capturing images of the relevant and irrelevant events in the scene.

As a solution for this problem, existing image sensors are designed to detect the relevant event in the scene for the SSM video recording based on motion detection. The image sensors are limited to handle at most to a wide field of vision. Moreover, a manufacturing cost of the image sensors increases due to designing the image sensors with a capability to automatically trigger the SSM video recording. Inbuilt storage resources available at the image sensors are suitable to record videos with lower frame rates only such as 60 fps. Thus, it is desired to address the above-mentioned shortcomings or at least provide a useful alternative.

SUMMARY

An electronic device according to an embodiment includes a memory, a first camera including a first image sensor and at least one processor, and the at least one processor is configured to obtain a plurality of image frames by photographing surroundings of the electronic device through the first camera, set a region of interest (ROI) on the plurality of image frames, obtain a motion identification map corresponding to each of the plurality of image frames and select at least one image frame from among the plurality of image frames based on the obtained motion identification map, identify whether there is a motion of an object on the ROI set on the selected at least one image frame, and perform a Super Slow Motion (SSM) function through the first camera based on a result of the identification, and the motion identification map is generated based on motion data detected in each of the plurality of image frames.

A controlling method of an electronic device that includes a first camera including a first image sensor according to an embodiment includes obtaining a plurality of image frames by photographing surroundings of the electronic device through the first camera, setting a region of interest (ROI) on the plurality of image frames, obtaining a motion identification map corresponding to each of the plurality of image frames and selecting at least one image frame from among the plurality of image frames based on the obtained motion identification map, identifying whether there is a motion of an object on the ROI set on the selected at least one image frame, and performing an SSM function through the first camera based on a result of the identification.

BRIEF DESCRIPTION OF THE DRAWINGS

This method and apparatus are illustrated in the accompanying drawings, throughout which like reference letters indicate corresponding parts in the various figures. The embodiments herein will be better understood from the following description with reference to the drawings, in which.

DETAILED DESCRIPTION

Figure 1:
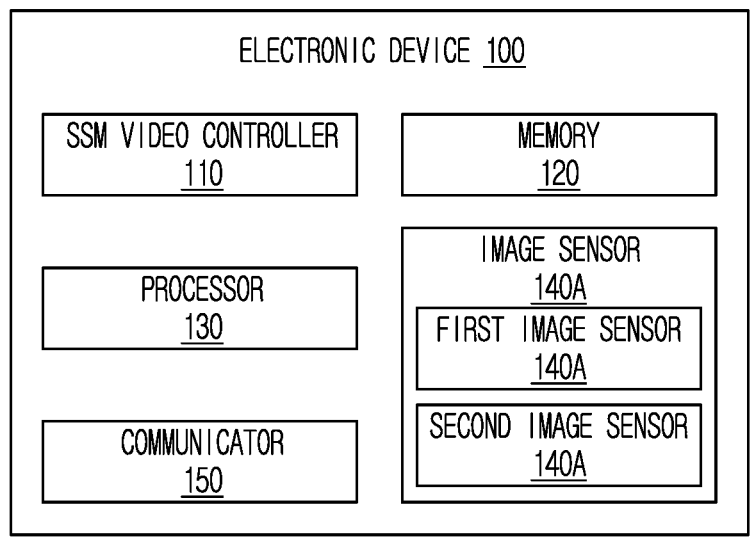
FIG. 1 is a block diagram of an electronic device for automatically controlling capturing of a Super Slow Motion (SSM) video of a scene, according to an embodiment as disclosed herein.

The present disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component). On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, in any context, an expression "a device configured to" may mean that the device is "capable of" together with other devices or components. For example, a "sub-processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be implemented in a specific hardware.

Meanwhile, various elements and areas in the drawings are illustrated schematically. Accordingly, the technical idea of the present disclosure is not limited to the relative size or spacing in the accompanying drawings.

The present disclosure is to solve the above-described problems, and the object of the present disclosure is to provide an electronic device for automatically triggering capturing of an SSM video of a scene based on a motion in the scene and a controlling method thereof.

The principal object of the embodiments herein is to provide a method and an electronic device for automatically triggering capturing of an SSM video of a scene based on a motion in the scene. Unlike existing systems, the electronic device can identify an exact instant at which the SSM video needs to record based on the motion in the scene. Therefore, the SSM video contains only a relevant image frames.

Another object of the embodiments herein is to trigger capturing of the SSM video of the scene in response to detecting the motion at an ROI in the image frames of the scene.

Another object of the embodiments herein is to analyze image frames of the scene for tracking the motion of a candidate movable object in the scene and predicting a trigger for capturing the SSM video based on the motion of the candidate movable object. Unlike existing systems, the electronic device will be prepared to trigger the recording of the SSM video of the scene based on the predication. Therefore, the electronic device will not be missed to record relevant image frames of the scene due to initiating the SSM video recording at right time.

Another object of the embodiments herein is to automatically switch recording of image frames from an image sensor with bigger FOV and image frames from an image sensor with smaller FOV for recording a relevant event associated with the candidate movable object.

Unlike existing method, the electronic device can switch to record the image frames of the bigger FOV in response to detecting that the candidate movable object is moving out of the smaller FOV while recording the image frames of the smaller FOV. Thus, the electronic device ensures to capture the SSM video containing the candidate movable object in the scene, even the candidate movable object moves outside the smaller FOV.

Accordingly, the embodiments herein provide a method for automatically controlling capturing of an SSM video of a scene using an electronic device. The method includes receiving, by the electronic device, a plurality of image frames of the scene displayed in a field of view of a first image sensor of the electronic device, where each of the plurality of image frames includes at least one ROI. Further, the method includes determining, by the electronic device, a confidence map for each of the plurality of image frames, where the confidence map corresponds to motion data of each of the at least one ROI. Further, the method includes selecting, by the electronic device, at least one image frame from the plurality of image frames based on the confidence map. Here, the confidence map can be referred to as a motion identification map.

Further, the method includes detecting, by the electronic device, whether a motion of the at least one ROI in the at least one selected image frame. Further, the method includes triggering, by the electronic device, capture of the SSM video based on the detection of the motion in the at least one ROI in the at least one selected image frame.

In an embodiment, where determining, by the electronic device, a confidence map for each of the plurality of image frames, includes segmenting, by the electronic device, each of the plurality of image frames into a plurality of segments, computing, by the electronic device, the motion data in each of the plurality of segments of each of the plurality of image frames, and determining, by the electronic device, the confidence map for each of the plurality of image frames by computing an average of the motion data of the plurality of segments of each of the plurality of image frames.

In an embodiment, where segmenting, by the electronic device, each of the plurality of image frames into the plurality of segments, includes determining, by the electronic device, whether a global motion of the electronic device is affected by an image frame of the plurality of image frames based on a metadata associated with the image frame, performing, by the electronic device, one of: discarding the image frame, and selecting a consecutive image frame from the plurality of the image frames for determining whether the global motion is affecting to the consecutive image frame, in response to determining that the global motion is affecting to the image frame, and segmenting the image frame into the plurality of segments, in response to determining that the global motion is unaffected to the image frame.

In an embodiment, where the metadata associated with the image frame includes at least one of a zoom in the image frame, an image stabilization in the image frame, a width and height of the image frame, attributes of the image frame, and inertial sensor values generated while previewing the image frame.

In an embodiment, where selecting, by the electronic device, the at least one image frame from the plurality of image frames based on the confidence map, includes comparing, by the electronic device, the confidence map of each of the plurality of image frames with a fair confidence threshold, and selecting, by the electronic device, the at least one image frame from the plurality of image frames for which the confidence map meets the fair confidence threshold.

In an embodiment, where fair confidence threshold is dynamically computed by receiving image frames of the scene displayed in the FOV of the first image sensor of the electronic device, segmenting each of the image frames into multiple regions, computing a motion data in each segmented region of each of the image frames, averaging the motion data in the segmented region of the image frames that are modelled for a fixed duration of time, and determining the fair confidence threshold based on a type of the scene and the average of the motion data using at least one artificial intelligence model.

In an embodiment, where detecting, by the electronic device, whether the motion of the at least one ROI in the at least one selected image frame, includes identifying, by the electronic device, at least one object available in the at least one selected frame by inputting the at least one selected frame to at least one artificial intelligence model, determining, by the electronic device, a velocity of the at least one identified object based on a statistical model, and detecting, by the electronic device, the motion of the at least one ROI in the at least one selected image frame based on the velocity of the at least one identified object.

In an embodiment, where the at least one artificial intelligence model is trained by receiving, by the electronic device, a plurality of image frames from a second image sensor of the electronic device, where an FOV of the second image sensor is bigger than the FOV of the first image sensor, recognizing, by the electronic device, at least one object in the each of the frames received from the second image sensor, classifying, by the electronic device, the at least one object based on the recognition, determining, by the electronic device, a weight for each of neural network node based on the at least one classified object, and training, by the electronic device, the at least one artificial intelligence model based on the weight for each of the neural network node. In an embodiment, where the at least one statistical model is trained by obtaining, by the electronic device, a plurality of parameters associated with the at least one object, and determining, by the electronic device, the velocity of the at least one object based on the plurality of parameters.

In an embodiment, where the plurality of parameters includes an object type, a bounding box, and a relation between the objects.

In an embodiment, where triggering, by the electronic device, capture of the SSM video based on the detection of the motion in the at least one ROI in the at least one selected image frame, includes determining, by the electronic device, whether the motion of the at least one ROI in the at least one selected image frame is detected, and performing, by the electronic device, one of: capturing the SSM video, in response to determining that the motion of the at least one ROI is detected in the at least one selected image frame, and receiving next set of image frames to detect the motion of the at least one ROI, in response to determining that the motion of the at least one ROI is not detected in the at least one selected image frame.

In an embodiment, where capturing the SSM video, includes determining, by the electronic device, whether the detected motion of the at least one ROI in the at least one selected image frame meets a motion threshold; and performing, by the electronic device, one of: capturing the SSM video using the first image sensor in response to determining that the detected motion of the at least one ROI does not meet the motion threshold, and automatically switching from the first image sensor to a second image sensor in response to determining that the detected motion of the at least one ROI meets the motion threshold, and capturing the SSM video using the second image sensor.

Accordingly, the embodiments herein provide the electronic device for automatically controlling capturing of the SSM video of the scene. The electronic device includes an SSM video controller, a memory, a processor and at least one image sensor, where the SSM video controller is coupled to the memory, the processor and the at least one image sensor. The SSM video controller is configured to receive the plurality of image frames of the scene displayed in the FOV of the first image sensor of the electronic device, where each of the plurality of image frames includes the at least one ROI. The SSM video controller is configured to determine the confidence map for each of the plurality of image frames, where the confidence map corresponds to the motion data of each of the at least one ROI. The SSM video controller is configured to select the at least one image frame from the plurality of image frames based on the confidence map. The SSM video controller is configured to detect whether the motion of the at least one ROI in the at least one selected image frame. The SSM video controller is configured to trigger capture of the SSM video based on the detection of the motion in the at least one ROI in the at least one selected image frame.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for automatically controlling capturing of a Super Slow Motion (SSM) video of a scene using an electronic device. The method includes receiving, by the electronic device, a plurality of image frames of a scene displayed in a Field of View (FOV) of a first image sensor of the electronic device, where each of the plurality of image frames includes at least one ROI. Further, the method includes determining, by the electronic device, a confidence map for each of the plurality of image frames, where the confidence map corresponds to motion data of each of the at least one Region of Interest (ROI). Further, the method includes selecting, by the electronic device, at least one image frame from the plurality of image frames based on the confidence map. Further, the method includes detecting, by the electronic device, whether a motion of the at least one ROI in the at least one selected image frame. Further, the method includes triggering, by the electronic device, capture of the SSM video based on the detection of the motion in the at least one ROI in the at least one selected image frame.

Unlike existing methods and systems, the proposed method allows the electronic device to detect a global motion such as a handshake affected to the electronic device and drastic changes in lighting conditions while previewing the scene. Further, the electronic device eliminates false triggers for capturing the SSM video occurs due to the global motion affected to the electronic device and the drastic changes in lighting conditions. Hence, the trigger for recording the SSM video is accurate without compromising on a performance of the electronic device. Further, the proposed method is suitable to implement using any type of existing image sensors such as a wide image sensor, a tele image sensor, and an Ultra-Wide (UW) image sensor, etc. with any type of frame rates such as 30 fps, 120 fps, 480 fps, 960 fps, etc. for capturing the SSM video.

Referring now to the drawings, and more particularly to FIGS. 1 through 15, there are shown preferred embodiments.

FIG. 1 is a block diagram of an electronic device 100 for automatically controlling capturing of the SSM video of the scene, according to an embodiment as disclosed herein. Examples for the electronic device 100 are, but not limited to a smart phone, a tablet computer, a personal digital assistance (PDA), an Internet of Things (IoT), a camera, a robot and the like.

In an embodiment, the electronic device 100 includes an SSM video controller 110, a memory 120, a processor 130, at least one image sensor 140 and a communicator 150. However, the components illustrated in FIG. 1 is an exemplary view for implementing embodiments of the present disclosure, and appropriate hardware and software components that are obvious to those skilled in the art may be additionally included in the electronic device 100.

The SSM video controller 110 is coupled to the memory 120, the processor 130 and the at least one image sensor 140. Examples for the at least one image sensor 140 are, but not limited to a wide image sensor, a tele image sensor, and an Ultra-Wide (UW) image sensor, etc.

In an embodiment, the at least one image sensor 140 includes a first image sensor 140A and a second image sensor 140B, where an FOV of the second image sensor 140B is bigger than a FOV of the first image sensor 140A. In an example, the first image sensor 140A is designed to capture a wide FOV of the scene, and the second image sensor 140B is designed to capture an UW FOV of the scene. In an embodiment, the image sensor 140 is made of Charge-Coupled Device (CCD) modules or a Complementary Metal Oxide Semiconductor (CMOS) modules.

The SSM video controller 110 is configured to receive a plurality of image frames of the scene displayed in the FOV of the first image sensor 140A of the electronic device 100. In an embodiment, each of the plurality of image frames includes at least one ROI. In another embodiment, the FOV is the ROI. The SSM video controller 110 is configured to display a preview of the scene displayed on the FOV of the first image sensor 140A on a display of the electronic device 100. In an embodiment, the user can input the at least one ROI to the electronic device 100 by marking the ROI on the display of the electronic device 100. In an embodiment, the electronic device 100 considers the FOV of the first image sensor 140A as the ROI, in response to not receiving the input from the user.

The SSM video controller 110 is configured to determine a confidence map for each of the plurality of image frames, where the confidence map corresponds to motion data of each of the at least one ROI. In an embodiment, the SSM video controller 110 is configured to segment each of the plurality of image frames into a plurality of segments (e.g. rectangular blocks). Further, the SSM video controller 110 is configured to perform input modeling by computing the motion data in each segment of the plurality of segments of each of the plurality of image frames using a set of statistical variables (e.g. mean, variance, etc.). Further, the SSM video controller 110 is configured to determine the confidence map for each of the plurality of image frames by computing an average of the motion data of the plurality of segments of each of the plurality of image frames.

In an embodiment, the SSM video controller 110 is configured to determine whether a global motion such as a handshake of the electronic device 100 is affected by an image frame of the plurality of image frames based on a metadata associated with the image frame. In an embodiment, the metadata associated with the image frame includes at least one of a zoom in the image frame, image stabilization in the image frame, a width and height of the image frame, attributes of the image frame, and inertial sensor values generated while previewing the image frame. The SSM video controller 110 is configured to discard the image frame, and select a consecutive image frame from the plurality of the image frames for determining whether the global motion is affecting to the consecutive image frame, in response to determining that the global motion is affecting to the image frame. The SSM video controller 110 is configured to segment the image frame into the plurality of segments, in response to determining that the global motion is unaffected to the image frame.

The SSM video controller 110 is configured to select at least one image frame from the plurality of image frames based on the confidence map. In an embodiment, the SSM video controller 110 is configured to compare the confidence map of each of the plurality of image frames with a fair confidence threshold. Further, the SSM video controller 110 is configured to select the at least one image frame from the plurality of image frames for which the confidence map meets the fair confidence threshold.

In an embodiment, the SSM video controller 110 is configured to receive image frames of the scene displayed in the FOV of the first image sensor 140A. Further, the SSM video controller 110 is configured to segment each of the image frames into multiple regions. Further, the SSM video controller 110 is configured to compute a motion data in each segmented region of each of the image frames. Further, the SSM video controller 110 is configured to average the motion data in the segmented region of the image frames that are modelled for a fixed duration of time (e.g. 5 seconds). Further, the SSM video controller 110 is configured to determine the fair confidence threshold based on a type of the scene and the average of the motion data using at least one artificial intelligence model. Example for the type of the scene are a scene contains faster motion, a scene contains slow motion, and the like. In an embodiment, the type of the scene is determined by analyzing the scene.

The SSM video controller 110 is configured to detect whether a motion of the at least one ROI in the at least one selected image frame. In an embodiment, the SSM video controller 110 is configured to perform AI scene analysis to identify at least one object available in the at least one selected frame by inputting the at least one selected frame to an Artificial Intelligence (AI) model. Further, the SSM video controller 110 is configured to perform statistical analysis on the image frames to determine a velocity of the at least one identified object based on a statistical model. The SSM video controller 110 is configured to detect the motion of the at least one ROI in the at least one selected image frame based on the velocity of the at least one identified object.

At least one of the plurality of modules may be implemented through the AI model. A function associated with AI may be performed through the memory 120, and the processor 130.

The processor 130 may include one or a plurality of processors. At this time, one or a plurality of processors may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU).

In an embodiment, the one or a plurality of processors control processing of the input data in accordance with a predefined operating rule or AI model stored in the memory 120. The predefined operating rule or AI model is provided through training or learning.

Here, being provided through learning means that, by applying a learning method to a plurality of learning data, a predefined operating rule or AI model of a desired characteristic is made. The learning may be performed in the electronic device 100 itself in which the AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The learning method is a method for training a predetermined target device (for example, a robot, the electronic device 100 using a plurality of learning data to cause, allow, or control the target device to make a determination or prediction. Examples of learning methods include, but are not limited to, supervised learning, unsupervised learning, semi-supervised learning, or reinforcement learning.

In an embodiment, the SSM video controller 110 is configured to configured to train the AI model for identifying at least one object available in the at least one selected frame. The SSM video controller 110 is configured to receive a plurality of image frames from the second image sensor 140B of the electronic device 100. The SSM video controller 110 is configured to recognize at least one object in the each of the frames received from the second image sensor 140B using a learned knowledge at the AI model. The SSM video controller 110 is configured to classify the at least one object as a movable object or a static object based on the recognition. The SSM video controller 110 is configured to determine a weight for each of neural network node based on the at least one classified object. Further, the SSM video controller 110 is configured to train the AI model based on the weight for each of the neural network node.

In an embodiment, the SSM video controller 110 is configured to train the at least one statistical model for determining the velocity of the at least one identified object.

The SSM video controller 110 is configured to obtain a plurality of parameters associated with the at least one object. In an embodiment, the plurality of parameters includes an object type, a bounding box, and a relation between the objects. The SSM video controller 110 is configured to determine the velocity of the at least one object based on the plurality of parameters.

The SSM video controller 110 is configured to trigger capture of the SSM video based on the detection of the motion in the at least one ROI in the at least one selected image frame. In an embodiment, the SSM video controller 110 is configured to determine whether the motion of the at least one ROI in the at least one selected image frame is detected. The SSM video controller 110 is configured to capture the SSM video, in response to determining that the motion of the at least one ROI is detected in the at least one selected image frame. The SSM video controller 110 is configured to receive next set of image frames to detect the motion of the at least one ROI, in response to determining that the motion of the at least one ROI is not detected in the at least one selected image frame. The SSM video controller 110 is configured to determine whether the detected motion of the at least one ROI in the at least one selected image frame meets a motion threshold. The SSM video controller 110 is configured to capture the SSM video using the first image sensor 140A in response to determining that the detected motion of the at least one ROI does not meet the motion threshold. The SSM video controller 110 is configured to automatically switch from the first image sensor 140A to the second image sensor 140B in response to determining that the detected motion of the at least one ROI meets the motion threshold. Further, the SSM video controller 110 is configured to capture the SSM video using the second image sensor 140B.

The memory 120 stores the recorded SSM video. The memory 120 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM). In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory 120 respectively. In certain examples, a non-transitory storage medium may store data that can, over time, change (e.g., in Random Access Memory (RAM) or cache). The processor 130 is configured to execute instructions stored in the memory 120. An Image Signal Processor (ISP) is an example for the processor 130. The communicator 150 is configured to communicate internally between hardware components in the electronic device 100.

Although the FIG. 1 shows the hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components can be combined together to perform same or substantially similar function automatically controlling capturing of the SSM video of the scene.

Figure 2:
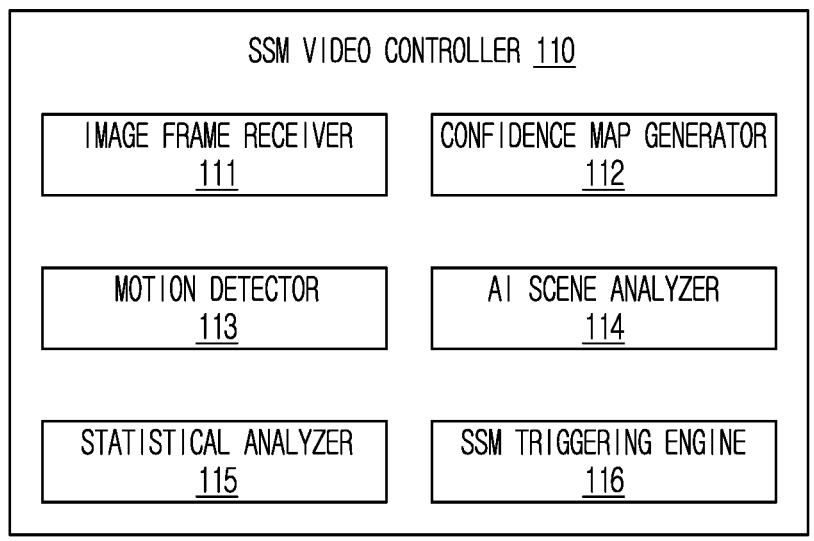
FIG. 2 is a block diagram of an SSM video controller for triggering capture of the SSM video of the scene, according to an embodiment as disclosed herein.

FIG. 2 is a block diagram of the SSM video controller 110 for triggering capture of the SSM video of the scene, according to an embodiment as disclosed herein. In an embodiment, the SSM video controller 110 includes an image frame receiver 111, a confidence map generator 112, a motion detector 113, an AI scene analyzer 114, a statistical analyzer 115, and an SSM triggering engine 116. The image frame receiver 111 receives the plurality of image frames of the scene displayed in the FOV of the first image sensor 140A of the electronic device 100.

The confidence map generator 112 determines the confidence map for each of the plurality of image frames. In an embodiment, the confidence map generator 112 segments each of the plurality of image frames into a plurality of segments (e.g. rectangular blocks). Further, the confidence map generator 112 performs input modeling by computing the motion data in each segment of the plurality of segments of each of the plurality of image frames using the set of statistical variables (e.g. mean, variance, etc.). Further, the confidence map generator 112 determines the confidence map for each of the plurality of image frames by computing the average of the motion data of the plurality of segments of each of the plurality of image frames.

In an embodiment, the motion detector 113 determines whether the global motion of the electronic device 100 is affected by the image frame of the plurality of image frames based on the metadata associated with the image frame. Further, the image frame receiver 111 discards the image frame, and selects the consecutive image frame from the plurality of the image frames for determining whether the global motion is affecting to the consecutive image frame, in response to determining that the global motion is affecting to the image frame. Further, the confidence map generator 112 segments the image frame into the plurality of segments, in response to determining that the global motion is unaffected to the image frame.

The image frame receiver 111 selects at least one image frame from the plurality of image frames based on the confidence map. In an embodiment, the image frame receiver 111 compares the confidence map of each of the plurality of image frames with the fair confidence threshold. Further, the image frame receiver 111 selects the at least one image frame from the plurality of image frames for which the confidence map meets the fair confidence threshold.

In an embodiment, the image frame receiver 111 receives the image frames of the scene displayed in the FOV of the first image sensor 140A. Further, the confidence map generator 112 segments each of the image frames into the multiple regions. Further, the confidence map generator 112 computes the motion data in each segmented region of each of the image frames. Further, the confidence map generator 112 averages the motion data in the segmented region of the image frames that are modelled for a fixed duration of time (e.g. 5 seconds). Further, the confidence map generator 112 determines the fair confidence threshold based on the type of the scene and the average of the motion data using the at least one artificial intelligence model.

The motion detector 113 detects whether the motion of the at least one ROI in the at least one selected image frame. In an embodiment, the AI scene analyzer 114 performs the AI scene analysis to identify at least one object available in the at least one selected frame by inputting the at least one selected frame to the AI model. Further, the statistical analyzer 115 performs the statistical analysis on the image frames to determine the velocity of the at least one identified object based on the statistical model. The motion detector 113 detects the motion of the at least one ROI in the at least one selected image frame based on the velocity of the at least one identified object.

In an embodiment, the AI scene analyzer 114 trains the AI model for identifying the at least one object available in the at least one selected frame. The AI scene analyzer 114 receives the plurality of image frames from the second image sensor 140B of the electronic device 100. The AI scene analyzer 114 recognizes the at least one object in the each of the frames received from the second image sensor 140B using the learned knowledge at the AI model. The AI scene analyzer 114 classifies the at least one object as the movable object or the static object based on the recognition. The AI scene analyzer 114 determines the weight for each of neural network node based on the at least one classified object. Further, the AI scene analyzer 114 trains the AI model based on the weight for each of the neural network node.

In an embodiment, the statistical analyzer 115 trains the at least one statistical model for determining the velocity of the at least one identified object. The statistical analyzer 115 obtains the plurality of parameters associated with the at least one object. The statistical analyzer 115 determines the velocity of the at least one object based on the plurality of parameters.

The SSM triggering engine 116 triggers capture of the SSM video based on the detection of the motion in the at least one ROI in the at least one selected image frame. In an embodiment, the SSM triggering engine 116 determines whether the motion of the at least one ROI in the at least one selected image frame is detected. The SSM triggering engine 116 captures the SSM video, in response to determining that the motion of the at least one ROI is detected in the at least one selected image frame. The SSM triggering engine 116 receives the next set of image frames to detect the motion of the at least one ROI, in response to determining that the motion of the at least one ROI is not detected in the at least one selected image frame. The SSM triggering engine 116 determines whether the detected motion of the at least one ROI in the at least one selected image frame meets the motion threshold. The SSM triggering engine 116 captures the SSM video using the first image sensor 140A in response to determining that the detected motion of the at least one ROI does not meet the motion threshold. The SSM triggering engine 116 automatically switches from the first image sensor 140A to the second image sensor 140B in response to determining that the detected motion of the at least one ROI meets the motion threshold. Further, the SSM triggering engine 116 captures the SSM video using the second image sensor 140B.

Although the FIG. 2 shows the hardware components of the SSM video controller 110 but it is to be understood that other embodiments are not limited thereon. In other embodiments, the SSM video controller 110 may include less or more number of components. Further, the labels or names of the components are used only for illustrative purpose and does not limit the scope of the disclosure. One or more components can be combined together to perform same or substantially similar function for triggering capture of the SSM video of the scene.

Figure 3:
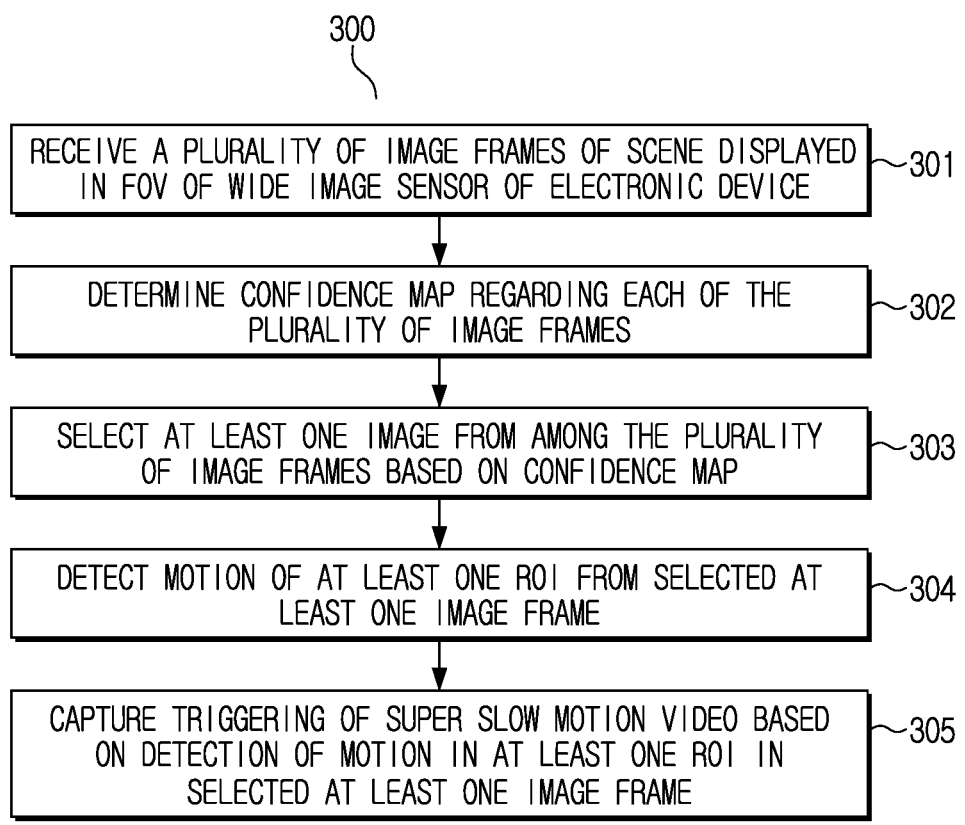
FIG. 3 is a flow diagram illustrating a method for triggering the capture of the SSM video of the scene using the electronic device, according to an embodiment as disclosed herein.

FIG. 3 is a flow diagram 300 illustrating a method for triggering the capture of the SSM video of the scene using the electronic device 100, according to an embodiment as disclosed herein. At step 301, the method includes receiving the plurality of image frames of the scene displayed in the FOV of the first image sensor 140A of the electronic device 100. In an embodiment, the method allows the image frame receiver 111 to receive the plurality of image frames of the scene displayed in the FOV of the first image sensor 140A of the electronic device 100. At step 302, the method includes determining the confidence map for each of the plurality of image frames. In an embodiment, the method allows the confidence map generator 112 to determine the confidence map for each of the plurality of image frames. At step 303, the method includes selecting at least one image frame from the plurality of image frames based on the confidence map. In an embodiment, the method allows the image frame receiver 111 to select at least one image frame from the plurality of image frames based on the confidence map. At step 304, the method includes detecting whether the motion of the at least one ROI in the at least one selected image frame. In an embodiment, the method allows the motion detector 113 to detect whether the motion of the at least one ROI in the at least one selected image frame. At step 305, the method includes triggering capture of the SSM video based on the detection of the motion in the at least one ROI in the at least one selected image frame. In an embodiment, the method allows the SSM triggering engine 116 to trigger capture of the SSM video based on the detection of the motion in the at least one ROI in the at least one selected image frame.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the disclosure.

Figure 4A:
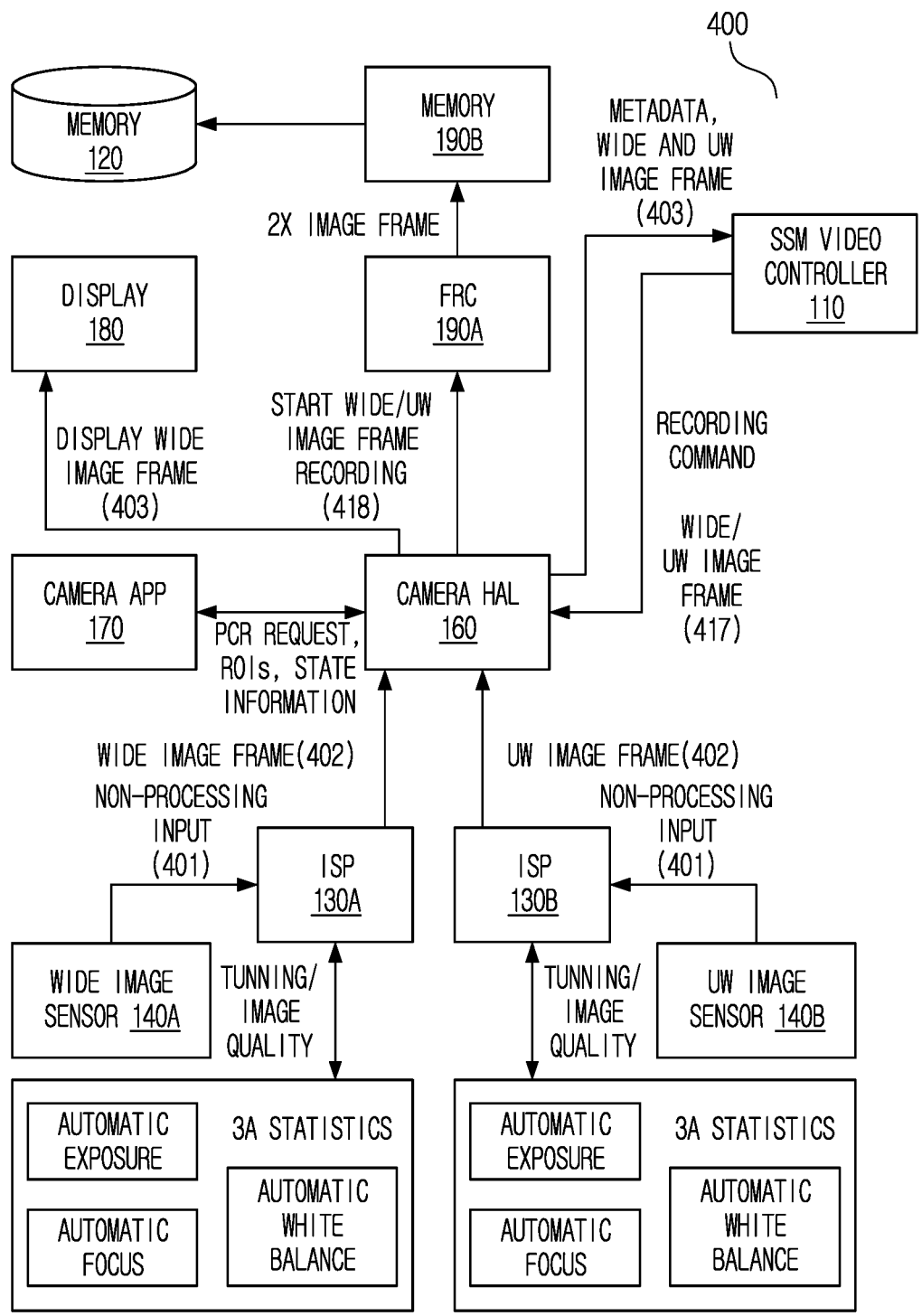
FIGS. 4A-4B is a flow diagram illustrating a method for automatically controlling capturing of the SSM video of the scene using the electronic device, according to an embodiment as disclosed herein.
Figure 4B:
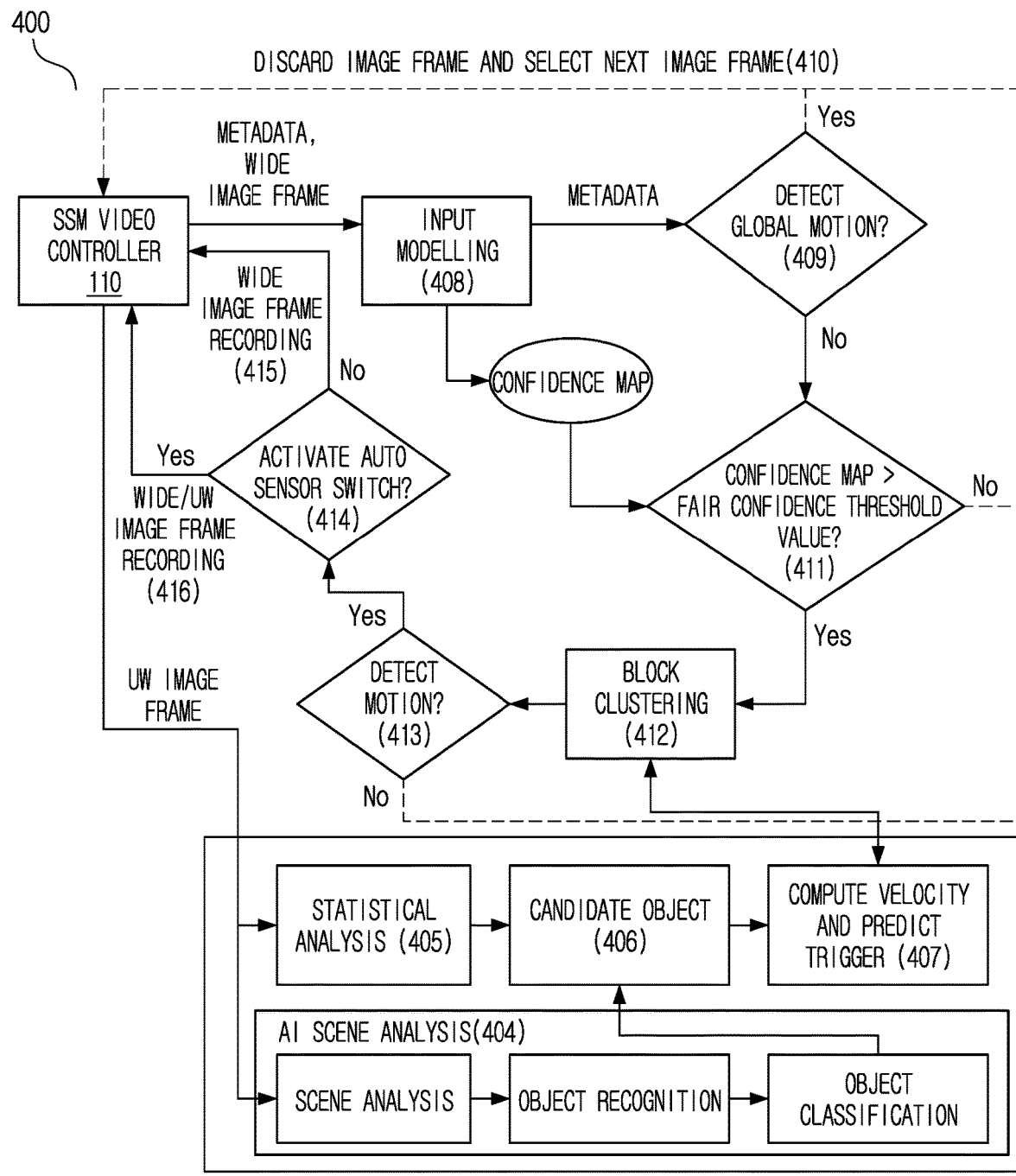

FIG. 4 is a flow diagram 400 illustrating a method for automatically controlling capturing of the SSM video of the scene using the electronic device 100, according to an embodiment as disclosed herein. In another embodiment, the electronic device 100 includes the SSM video controller 110, the memory 120, an ISP 130A, an ISP 130B, the wide image sensor 140A, the UW image sensor 140B, the communicator 150, a camera Hardware Abstraction Layer (HAL) 160, a camera app 170, a display 180, a frame rate converter (FRC) 190A, and an encoder 190B. The ISP 130A is connected to the wide image sensor 140A and the camera HAL 160. The ISP 130B is coupled to the UW image sensor 140B and the camera HAL 160. Further, the camera HAL 160 is connected to the camera app 170, the display 180, the FRC 190A, and the SSM video controller 110. The encoder 190B is connected to the FRC 190A and the memory 120. Consider, the user inputs the electronic device 100 to open the camera app and capture the SSM video of the scene or a sequential set of images of an event contain high speed motion such as a football kick using the camera app. The electronic device 100 configures the ISP 130A and ISP 130B to capture the image frames on the FOV of the wide image sensor 140A and the UW image sensor 140B respectively, in response to receiving the input. At step 401, the wide image sensor 140A and the UW image sensor 140B capture the image frames and feed raw inputs of the image frames to the ISP 130A and ISP 130B respectively. Further, the ISP 130A and ISP 130B adjust 3A stats includes auto exposure, auto focus, auto white balance at the wide image sensor 140A and the UW image sensor 140B respectively for turning and improving image quality. The ISP 130A and ISP 130B generates wide image frames (i.e. image frames from the FOV of the wide image sensor 140A) and UW image frames (i.e. image frames from the FOV of the UW image sensor 140B) using the raw inputs. At step 402, the ISP 130A and ISP 130B sends the wide image frames and the UW image frames to the camera HAL 160. The camera HAL 160 displays a user interface of the camera app and previews the wide image frames in the user interface of the camera app. Further, the user can use the camera app to send a PCR request, mark ROIs, know state information, and the like. The camera HAL 160 determines the metadata and associates the metadata with the wide image frames. At step 403, the camera HAL 160 sends the wide and UW image frames and the associated metadata to the SSM video controller 110.

At step 404, the SSM video controller 110 performs the AI scene analysis on the UW image frames to identify the movable objects and the static objects in the scene. The SSM video controller 110 analyses the scene captured in the UW image frames to understand the scene using the AI model for better SSM use case customization to different scenes like daylight, night, fire, water, sky etc. Further, the SSM video controller 110 recognises the objects in the scene using the AI model. Further, the SSM video controller 110 classifies the recognised objects as the movable objects and the static objects using the AI model. Since the AI model is trained to detect various objects like balloon, dart, ball etc., the SSM video controller 110 performs the scene analysis by finding the combination of objects present in the scene. For example, a stream of frames having a balloon and a dart will be recognized as the dart will hit the balloon and burst the balloon and thus the trigger will be optimized for the same. The scene analysis allows the SSM video controller 110 to determine whether the triggering object is getting out of the wide FOV and thus shifting to ultra-wide recording is beneficial. The SSM video controller 110 estimates a depth of objects present in the scene. The depth information is further used by the SSM video controller 110 to determine important objects present in the scene and thus avoid false detections due to motion in far away or unimportant objects.

At step 405, the SSM video controller 110 performs the statistical analysis on the UW image frames to identify the movable objects and the static objects in the scene using the statistical model. The SSM video controller 110 computes position of a centroid of the candidate object in UW image frames. The SSM video controller 110 determines whether a distance between the centroid of an object in two UW image frames are greater than a threshold distance (e.g. 200 pixels). Further, the SSM video controller 110 classifies the object as the movable object when the distance between the centroid of the object in the two UW image frame is greater than the threshold distance. The SSM video controller 110 classifies the object as the static object when the distance between the centroid of the object in the two UW image frame is not greater than the threshold distance.

At step 406, the SSM video controller 110 determines the object that classified as the movable object from the AI scene analysis and the statistical analysis and assign as a candidate object. At step 407, the SSM video controller 110 computes the velocity of the candidate object, tracks the object, predicts the trajectory of the object and predicts the trigger to capture the SSM video based on the position of the centroid of the candidate object in the UW image frames.

At step 408, the SSM video controller 110 performs input modelling on the wide image frames using the static variables to generate the confidence map of the wide image frames. The SSM video controller 110 divides the wide image frames into small sub blocks and applies the static variables on the small sub blocks for a fixed duration of time to perform the input modelling. At step 409, the SSM video controller 110 determines whether the global motion is affected by the wide image frames based on the metadata. At step 410, in response to detecting the global motion is affecting to the wide image frames, the SSM video controller 110 discards the current wide image frame and select the next wide image frame. At step 411, in response to detecting the global motion is not affecting to the wide image frames, the SSM video controller 110 determines whether the confidence map is greater than the fair confidence threshold. In response to detecting the confidence map is not greater than the fair confidence threshold, the SSM video controller 110 discards the current wide image frame and select the next wide image frame.

At step 412, in response to detecting the confidence map is greater than the fair confidence threshold, the SSM video controller 110 generates a motion map of the UW image frames, where the motion map includes the white pixel blocks and black background. The white pixel blocks present in a location of the motion map indicates the motion present in corresponding location of the UW image frames. The SSM video controller 110 ignores small movements in the UW image frames and only significantly moving movements are marked as the white pixel blocks in the motion map. The SSM video controller 110 performs block clustering over the while pixel blocks to generate clusters of the white pixel blocks. Using a bound of 5, a 5-mean clustering method is deployed by the SSM video controller 110 for performs block clustering. Cluster that are very close to each other (determined by simple distance parameters i.e. $|(X_1-X_2)^2+(Y_1-Y_2)^2|$) are merged as a single cluster until only faraway and not connected clusters remain. If simple clustering has a clash e.g. close cluster centres but not well connected, the AI scene analyser 114 can be invoked for clarity on objects and their nature. A constraint on a cluster size along with bordering blocks can also be used for merging the clusters. Let, $C^1$ and $C^2$ are clusters that will be merged if the following conditions are met.

$$\text{size}(C^1) \le \frac{hw}{\alpha K_c}$$

$$\text{size}(C^2) \le \frac{hw}{\beta K_c} \text{ and } d_n \ge \frac{3D}{8}$$

where h and w are height and width of the UW image frame I respectively. $\alpha$ is an empirically determined constant that controls the minimum cluster size. $K_c$ is a total number of clusters taken in K-Means. $\beta$ is an empirically determined constant. $d_n$ is a number of blocks bordering both clusters. D is a total number of blocks bordering $C^2$. The clusters are merged recursively until these conditions don't hold true for any cluster pair. Additionally, the SSM video controller 110 uses density functions to understand sparse and dense objects and motions. The SSM video controller 110 determines a centre of the cluster.

At step 413, the SSM video controller 110 detects the motion in the ROI of the image frame in response detecting a change in the position of the centre of the cluster the image frames. The SSM video controller 110 does not detect motion in the ROI of the image frame in response not detecting the change in the position of the centre of the cluster the image frames. Further, the SSM video controller 110 discards the image frame and selects next image frame. At step 414, the SSM video controller 110 checks whether an auto sensor switch of the electronic device 100 is enabled. At step 415, the SSM video controller 110 decides to the record the wide image frames when the auto sensor switch is disabled. At step 416, the SSM video controller 110 chooses either the wide image frames or UW image frames for recording based on the position of the object in the image frames, when the auto sensor switch is enabled. If the candidate object is found to be moving out of the wide FOV, the SSM video controller 110 decides to record the SSM video using the UW sensor 140B to provide a better FOV of object motion.

At step 417, the SSM video controller 110 instructs the camera HAL 160 to record either the wide image frames or UW image frames as per the decision. At step 418, the camera HAL 160 instructs the FRC 190A to start recording the wide/UW image frames. The FRC 190A sends the wide/UW image frames to the encoder 190B after upscaling the wide/UW frame rate of the image frames. The encoder 190B encodes the wide/UW images frames to form the SSM video and sends the SSM video to the memory 120 to store.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
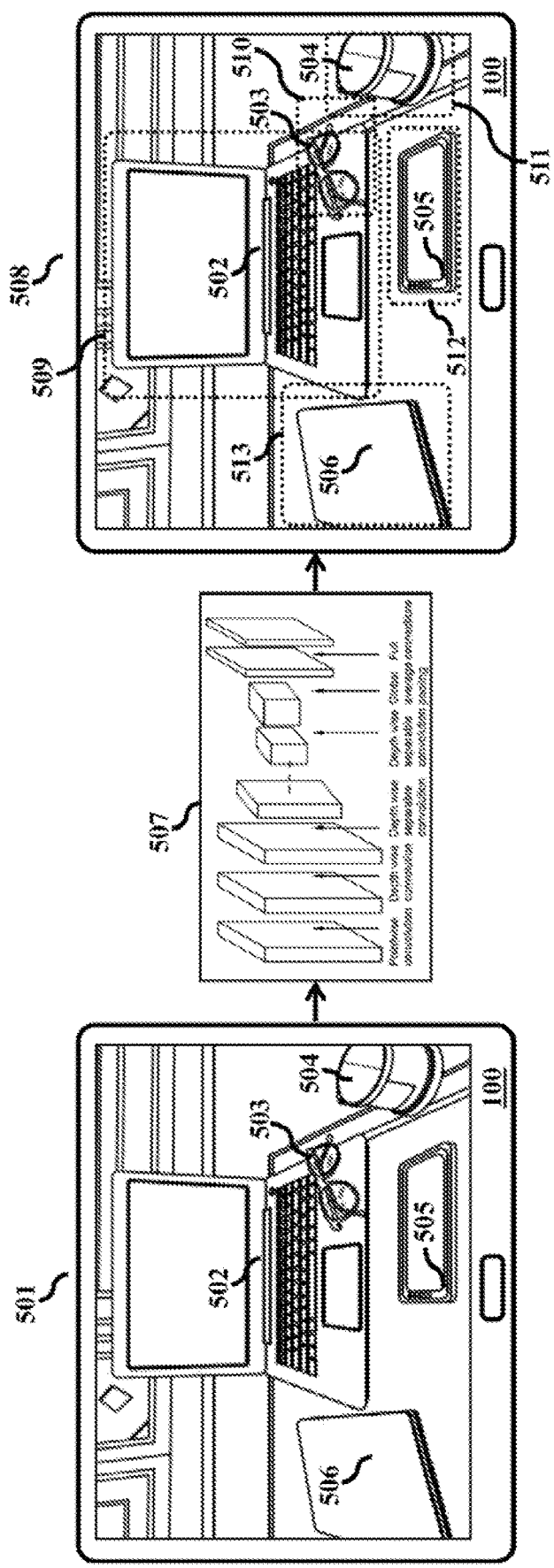
FIG. 5 is an example scenario illustrating the scene of an office cabin, where the electronic device identifies objects in the scene, according to an embodiment as disclosed herein.

FIG. 5 is an example scenario illustrating the scene of an office cabin, where the electronic device 100 identifies objects in the scene, according to an embodiment as disclosed herein. A laptop 502, a goggle 503, a cup 504, a smartphone 505 and a book 506 are placed in the office cabin. Consider, the camera app 170 of the electronic device 100 is previewing the office cabin and the objects placed in the office cabin as shown in 501. The electronic device 100 deploys the AI model 507 to analyze the scene in the image frames of the preview captured by the image sensor 140 to identify the objects present in the scene using the learned knowledge. As shown in 508, the electronic device 100 identifies the bounding boxes 509, 510, 511, 512, 513 to draw around the laptop 502, the goggle 503, the cup 504, the smartphone 505 and the book 506 respectively using the learned knowledge at the AI model. Further, the electronic device 100 identifies a location of the objects and a name of the objects using the learned knowledge at the AI model. A shape of the bounding box can be a square shape, a round shape, and the like. A size of the bounding box varies based on a size of the object. Further, the electronic device 100 classify objects present in the scene to the movable object or the static object using the learned knowledge at the AI model.

Figure 6:
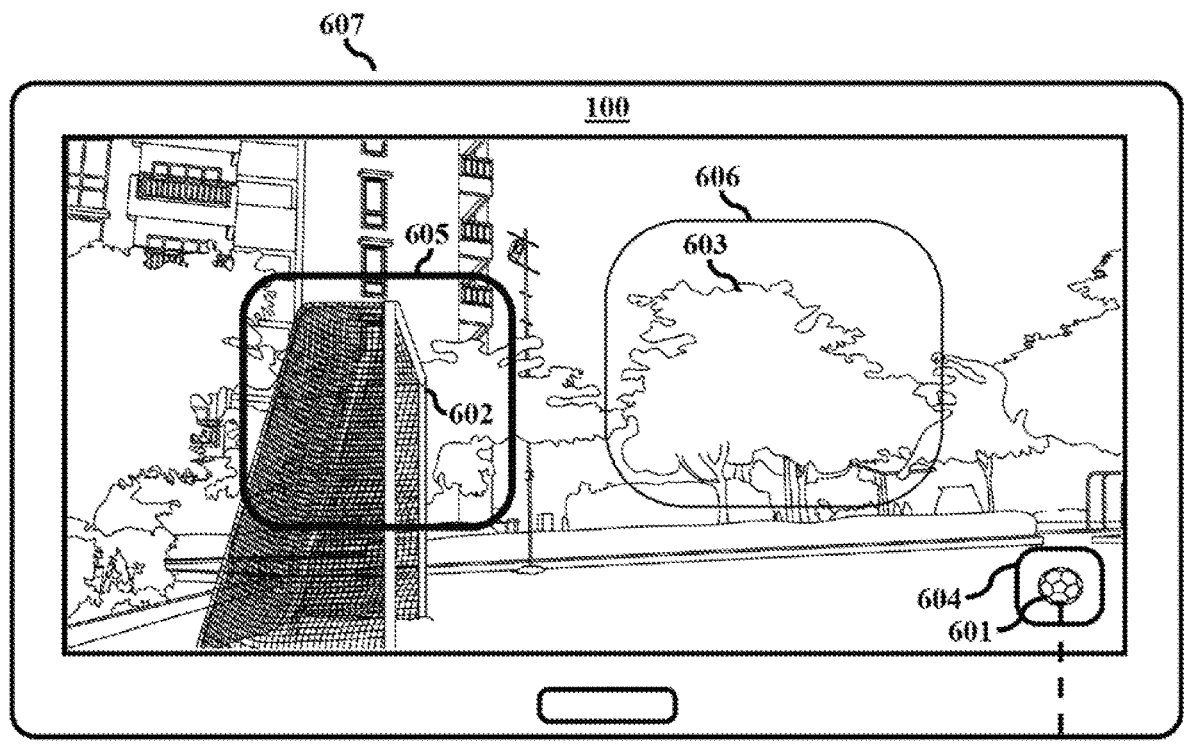
FIG. 6 is an example scenario illustrating the scene of a football playground, where the electronic device classifies the objects in the scene as movable object or static object using a statistical model, according to an embodiment as disclosed herein.
Figure 6:
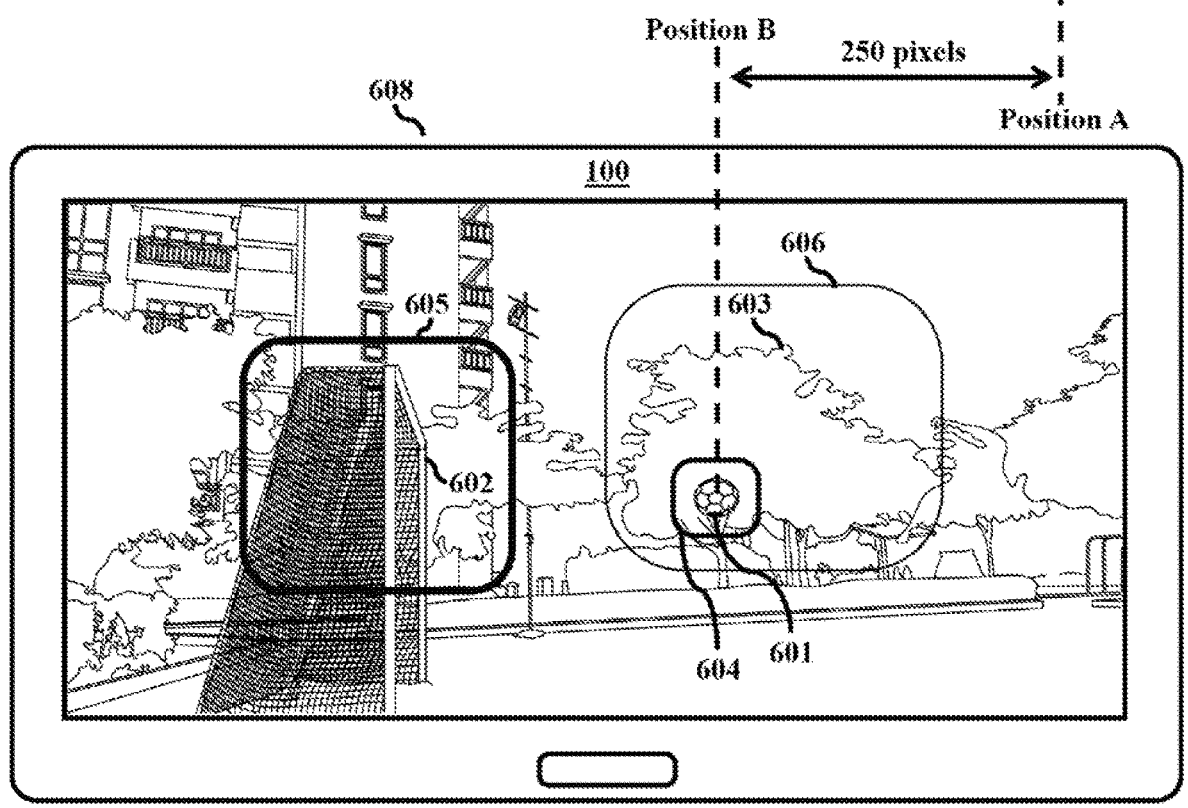

FIG. 6 is an example scenario illustrating the scene of a football playground, where the electronic device 100 classifies the objects in the scene as movable object or static object using a statistical model, according to an embodiment as disclosed herein. In the example scenario, consider the electronic device 100 is previewing the scene of the football playground includes the ball 601 that move towards the goal post 602, where the tree 603 is present in background. 607 and 608 represents a first image frame and a second image frame of the scene respectively previewing by the electronic device 100 while the ball 601 is moving. The electronic device 100 deploys the statistical model to detect the objects "ball 601, goal post 602, and tree 603" present in the scene. Further, the electronic device 100 displays bounding boxes 604, 605, 606 with varying thickness around the detected objects, where the thickness indicates the closeness of the object to the electronic device 100. Since, the tree 603 is the farthest one to the electronic device 100, the thickness of the bounding box 606 around the tree 603 is thinnest one. Since, the ball 601 is the closer to the electronic device 100 than the tree 603, the thickness of the bounding box 604 around the ball 601 is thicker than that of the tree 603. Since, the goal post 602 is the closest one to the electronic device 100, the thickness of the bounding box 605 around the goal post 602 is thicker than that of the ball 601. In an embodiment, different colors can also be given to the bounding boxes to show the closeness of the object to the electronic device 100. The electronic device 100 determines the centroid of the bounding box of objects in the image frames. Further, the electronic device 100 classifies the objects having difference between the centroids in two image frames, greater than a threshold value as the movable object while other objects as the static objects. Consider the threshold value is 200 pixels. A position of the centroid of bounding box 604 in first image frame 607 is at Position A, whereas the position of the centroid of bounding box 604 in second image frame 608 is at Position B. Consider, a difference between the centroids of the ball 601 in two image frames, that is a distance between positions A and B is 250 pixels. Since, the difference between the centroids of the ball 601 in two frames is more than 200 pixels, the electronic device 100 classifies the goal post 602 as the static object. Since, the difference between the centroids of the goal post 602 in two frames is zero pixels which is less than 200 pixels, the electronic device 100 classifies the goal post 602 as the static object. Since, the difference between the centroids of the tree 603 in two frames is zero pixels which is less than 200 pixels, the electronic device 100 classifies the tree 603 as the static object.

Figure 7A:
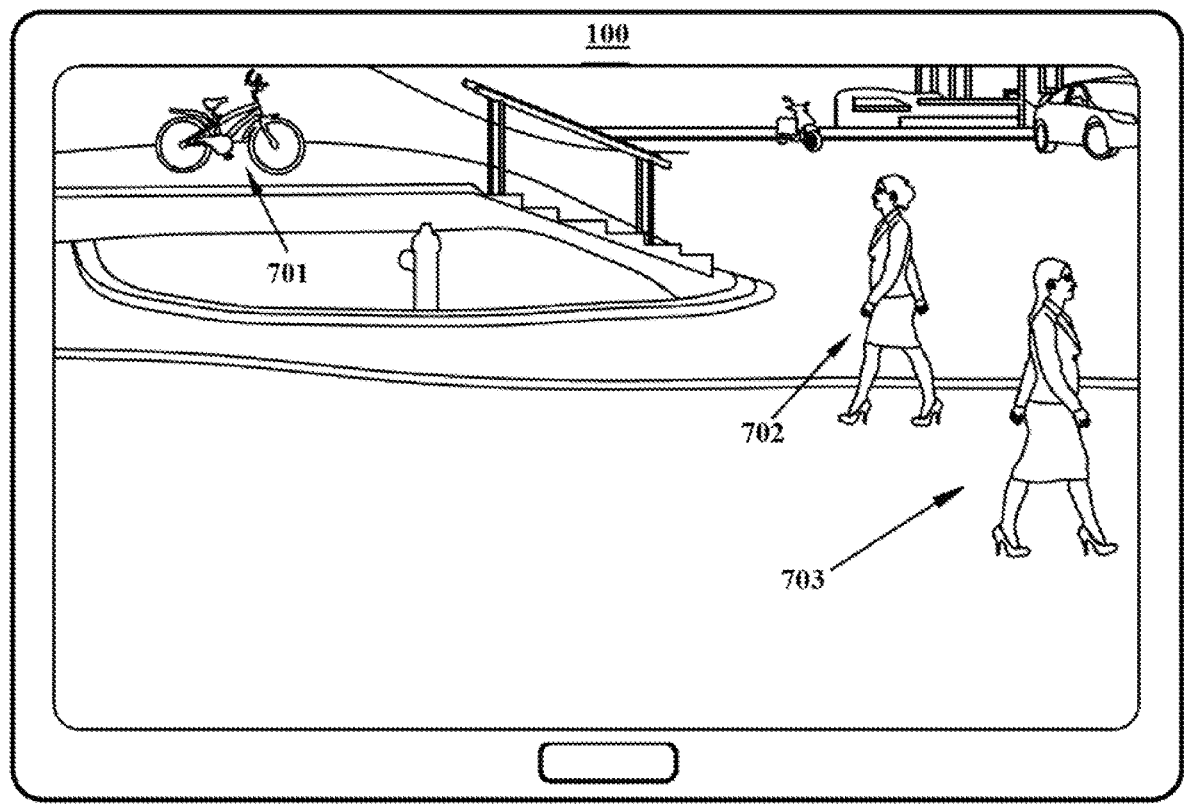
FIGS. 7A-7B is an example scenario illustrating the scene of a street, where electronic device generates a motion map of an image frame corresponds to the scene, according to an embodiment as disclosed herein.
Figure 7B:
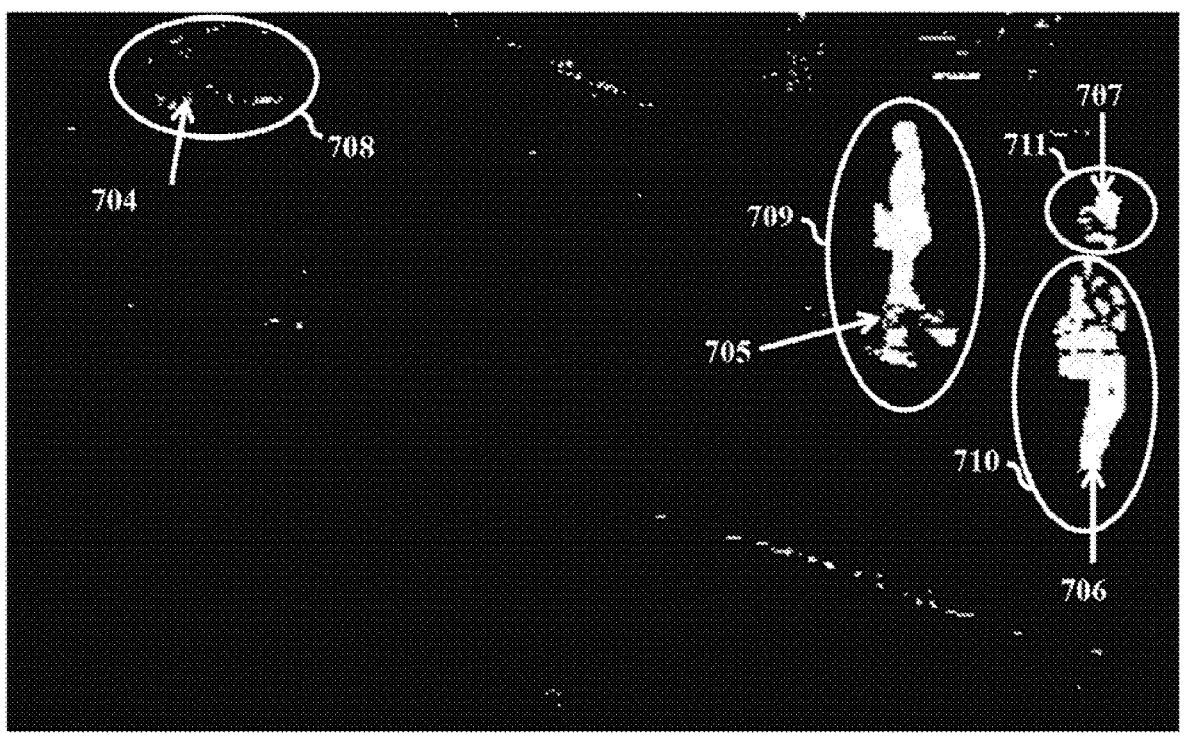

FIGS. 7A-7B is an example scenario illustrating the scene of a street, where electronic device 100 generates a motion map of an image frame corresponds to the scene, according to an embodiment as disclosed herein. The FIG. 7A illustrates the image frame of the scene of the street previewing by the electronic device 100, where the scene includes the movable objects 'a cycle 701, a first lady 702, and a second lady 703'. The cycle 701 is moving very slowly, and both the first lady 702 and the second lady 703 are walking faster. The FIG. 7B illustrates the motion map generated for the image frame of the scene by the electronic device 100. The motion data of the objects are marked as the white pixels in the motion map. The cluster formed using the white pixels marked for the cycle 701 is given as cluster 704. The cluster formed using the white pixels marked for the first lady 702 is given as cluster 705. The cluster formed using the white pixels marked for the second lady 703 is given as cluster 706 and cluster 707. The electronic device 100 generates the oval shaped bounding boxes 708, 709, 710, 711 around the clusters 704, 705, 706, 707 respectively and determines the center of the bounding box. Further, the electronic device 100 discards the cluster 704 due to less density of white pixels in the bounding box 708. Further, the electronic device 100 classifies the first lady 702 as the movable object due to large cluster size and accepting the density of white pixels in the bounding box 708. Further, the electronic device 100 merges the cluster 706 and the cluster 707 to form a single cluster due to closeness of the centres and the size of the bounding boxes 710 and 711. Further, the electronic device 100 classifies the second lady 703 as the movable object due to large cluster size and accepting the density of white pixels in the merged single cluster.

Figure 8:
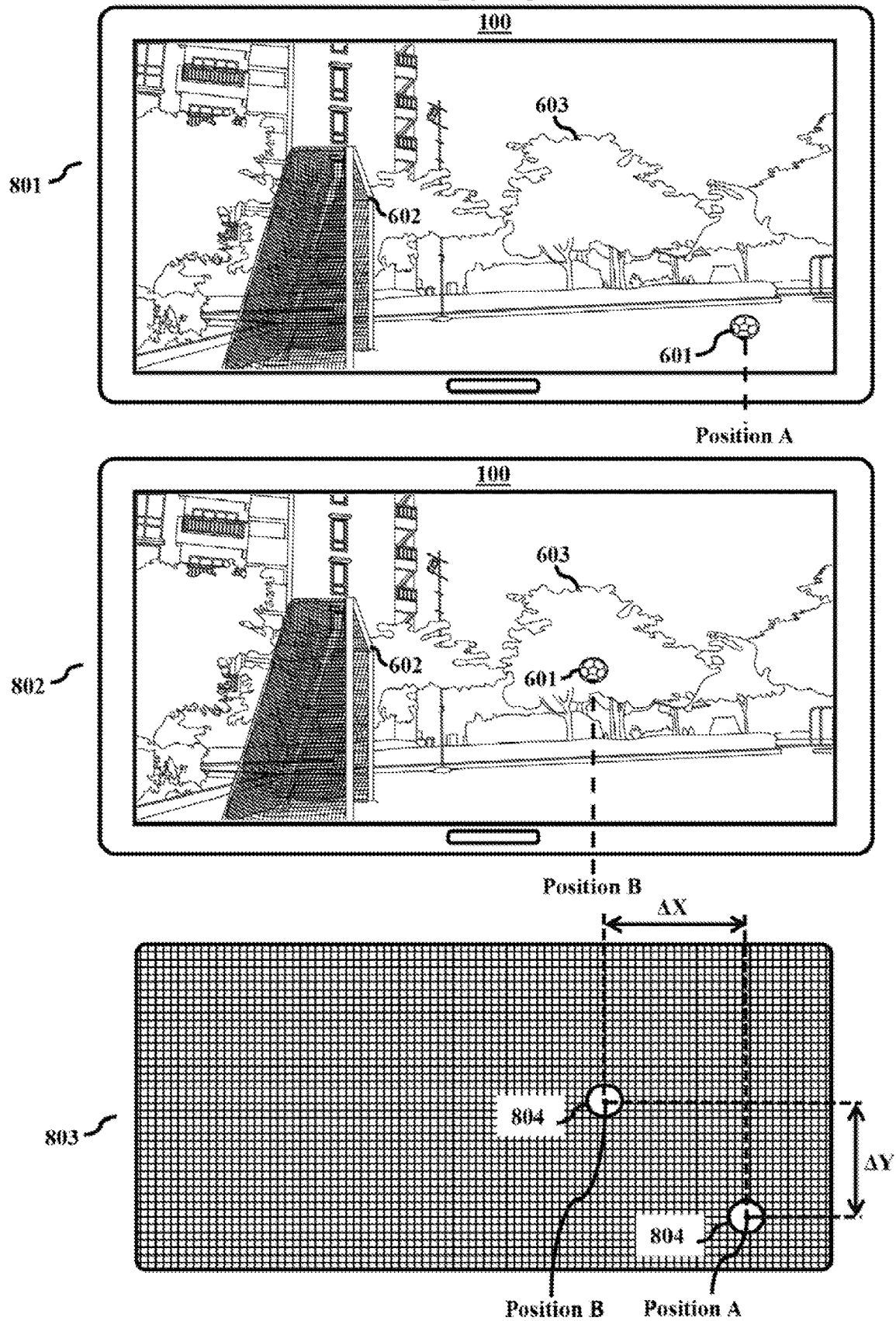
FIG. 8 is an example scenario illustrating the scene of the football playground, where the electronic device computes a velocity of the movable object in the scene, according to an embodiment as disclosed herein.

FIG. 8 is an example scenario illustrating the scene of the football playground, where the electronic device 100 computes the velocity of the movable object in the scene, according to an embodiment as disclosed herein. In the example scenario, consider the electronic device 100 is previewing the scene of the football playground, where the scene includes the ball 601 that is moving towards the goal post 602 and the tree 603 is present in background. 801 represents the first image frame of the scene previewing by the electronic device 100 when the position of the ball 601 is at the position A. 802 represents the second image frame of the scene previewing by the electronic device 100 when the position of the ball 601 is at the position B. In response to confirming that the ball 601 is the moving object in the scene based on change in position from the position A to the position B, the electronic device 100 determines a position of the centroid of the object by calculating (X, Y) coordinates of the centroid.

$$X = \frac{1}{N}\Sigma_{NPixels}X_i$$

$$Y = \frac{1}{N}\Sigma_{NPixels}Y_i$$

where, N is the total number of pixels in a motion blocks.

The centroid is essentially a centre of the object which is plotted over frames and the trajectory is predicted. $X_i$ and $Y_i$ are coordinates of the centre pixels of the motion blocks that constitute that object. Consider a 64×72 grid section corresponds to the image frames as shown 803. The white circle 804 made of white pixel blocks represents the motion blocks corresponds to the ball 601. The position of the white circle 804 corresponds to the position of the ball 601 in the first and second image frames 801, 802 are plotted in 803. The centroid of the ball 601 is represented with a dot at centre of the white circle 804.

The electronic device 100 determines the trajectory and shape of a path of the moving object, i.e. the ball 601 using the position coordinates of the centroid from at least 6 consecutive frames. The electronic device 100 uses the position coordinates of the centroid to solve a curve that fits either a parabolic, a circular or a linear equation. The electronic device 100 computes the velocity of the object by averaging the distance covered by the centroid between frames in X and Y directions. Further, the electronic device 100 estimates the frame at which the object will hit the ROI in the wide FOV using a pixel speed per frame. Further, the electronic device 100 computes a distance traversed by the centroid in vertical direction ΔY and a distance traversed by the centroid in horizontal direction ΔX. The electronic device 100 averages ΔX and ΔY over 4 or more frame to compute the average velocity $V_x$ and $V_y$. Further, the electronic device 100 predicts the frame number (Fn) for X direction at which the object enters to the ROI using the velocities and the distance between the object and the ROI using equation 1.

$$F_n = \frac{1}{V_x}(X_{ROI} - X_c) \quad \text{equation 1}$$

where XROI is X coordinate of the ROI and XC is X coordinate of the centroid. Similarly, frame number ($F_n$) is found for Y direction using equation 2 and the minimum of those is selected.

$$F_n = \frac{1}{V_y}(Y_{ROI} - Y_c) \quad \text{equation 2}$$

where YROI is Y coordinate of the ROI and YC is Y coordinate of the centroid.

FIGS. 9A-9I is an example scenario illustrating the scene of the football playground, where the electronic device 100 analyses each image frame of the scene to predict the trigger for the SSM video recording, according to an embodiment as disclosed herein. Consider the electronic device 100 is previewing the scene of the football playground. The FOV 901 of the UW image sensor 140B of the electronic device 100 includes the goal post 602, a playground 905, the tree 603, an apartment 904, and a light post 903 as shown in the FIG. 9A. The FOV 902 of the wide image sensor 140A of the electronic device 100 includes the goal post 602, the playground 905, the tree 603, the apartment 904, and the light post 903. The ROI in the example scenario is the FOV of the wide image sensor 140A.

Consider, the ball 601 enters to the FOV 901 of the UW image sensor 140B and the electronic device 100 displays the preview of successive image frames 906, 908, 910, 912, 914, 916, 918, 920 from the UW image sensor 140B. 907, 909, 911, 913, 915, 917, 919, 921 are the motion maps generated by the electronic device 100 for the image frames successive image frames 906, 908, 910, 912, 914, 916, 918, 920 respectively.

Figure 9A:
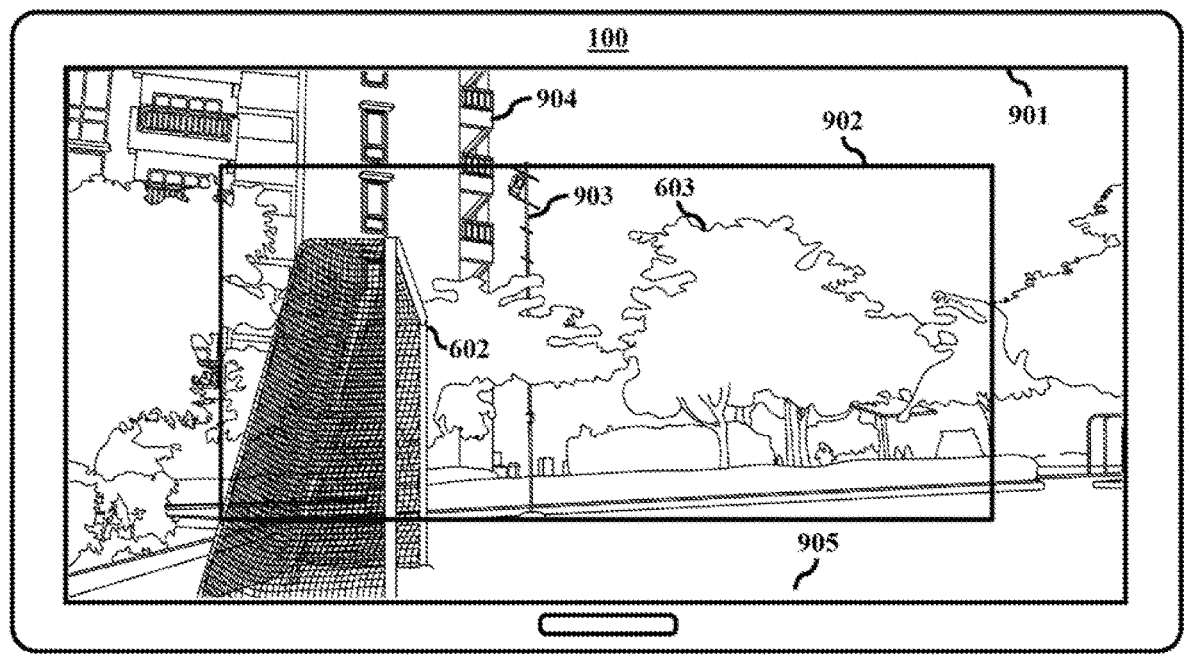
FIGS. 9A-9I is an example scenario illustrating the scene of the football playground, where the electronic device analyses each image frame of the scene to predict a trigger for SSM video recording, according to an embodiment as disclosed herein.
Figure 9B:
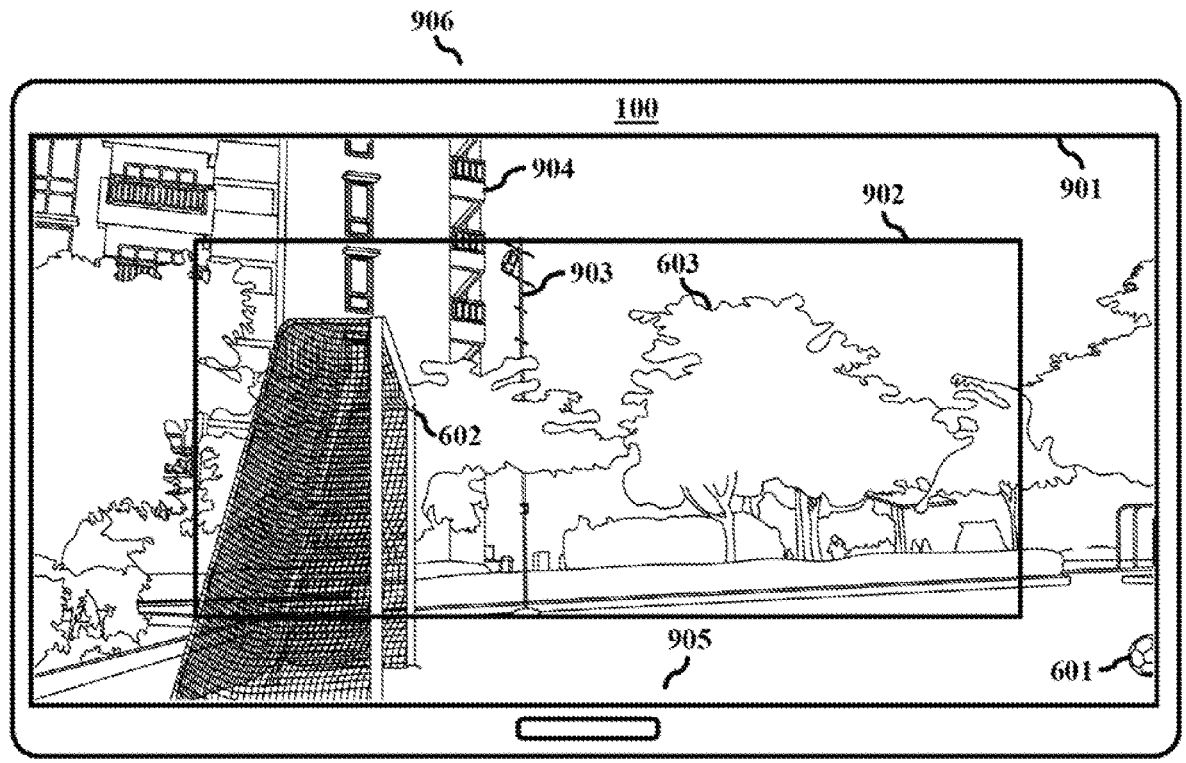
Figure 9B:
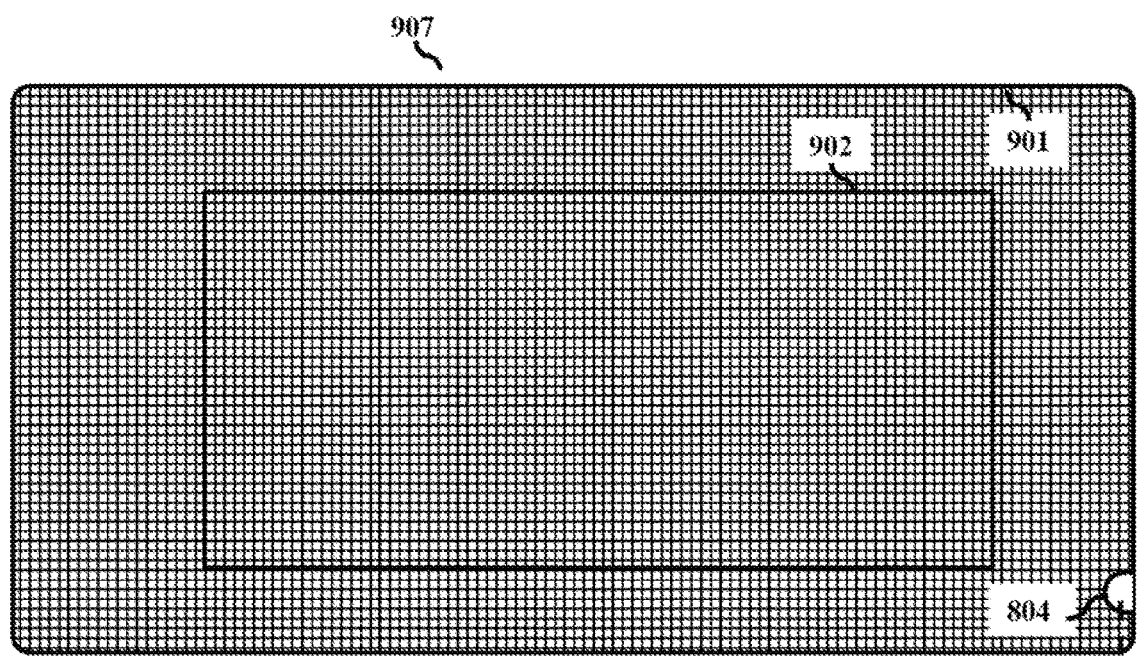
Figure 9C:
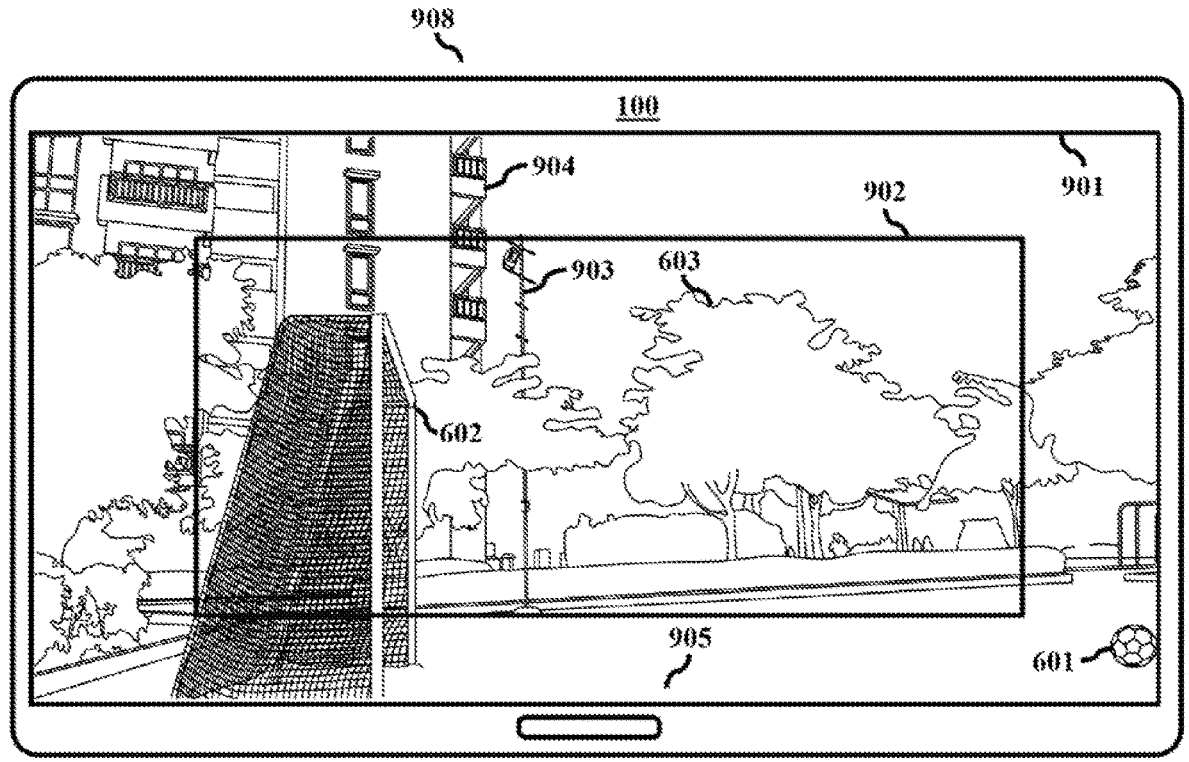
Figure 9C:
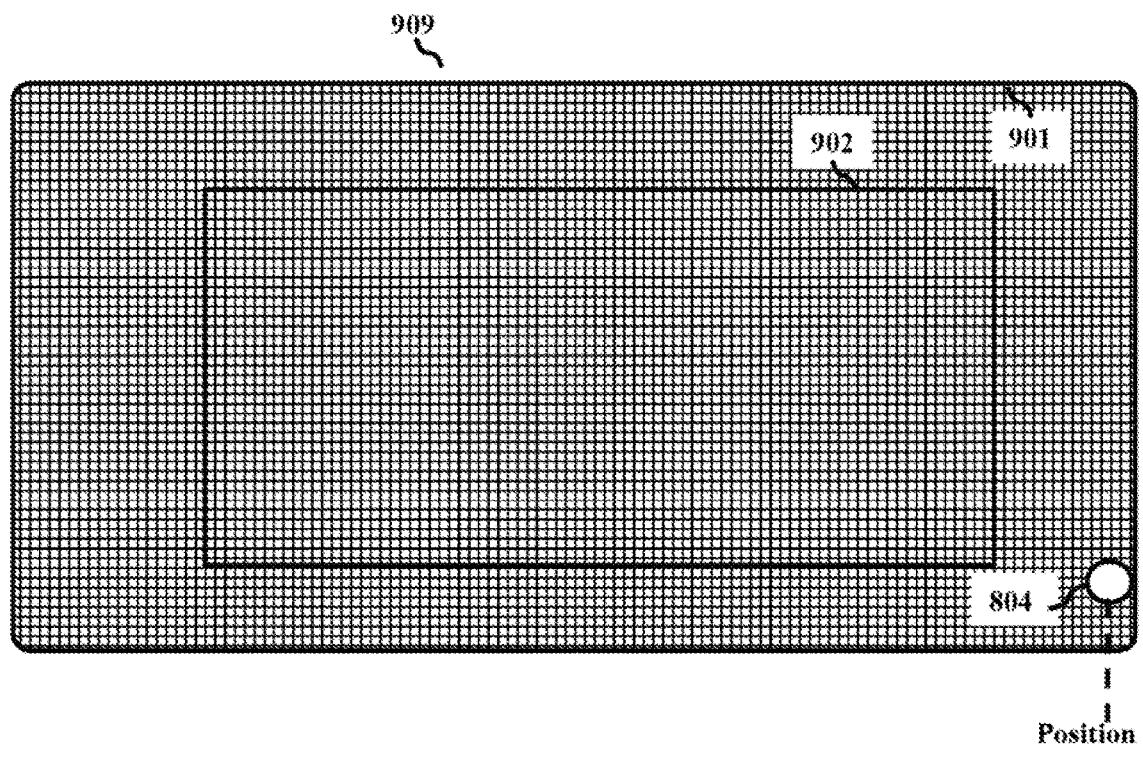
Figure 9D:
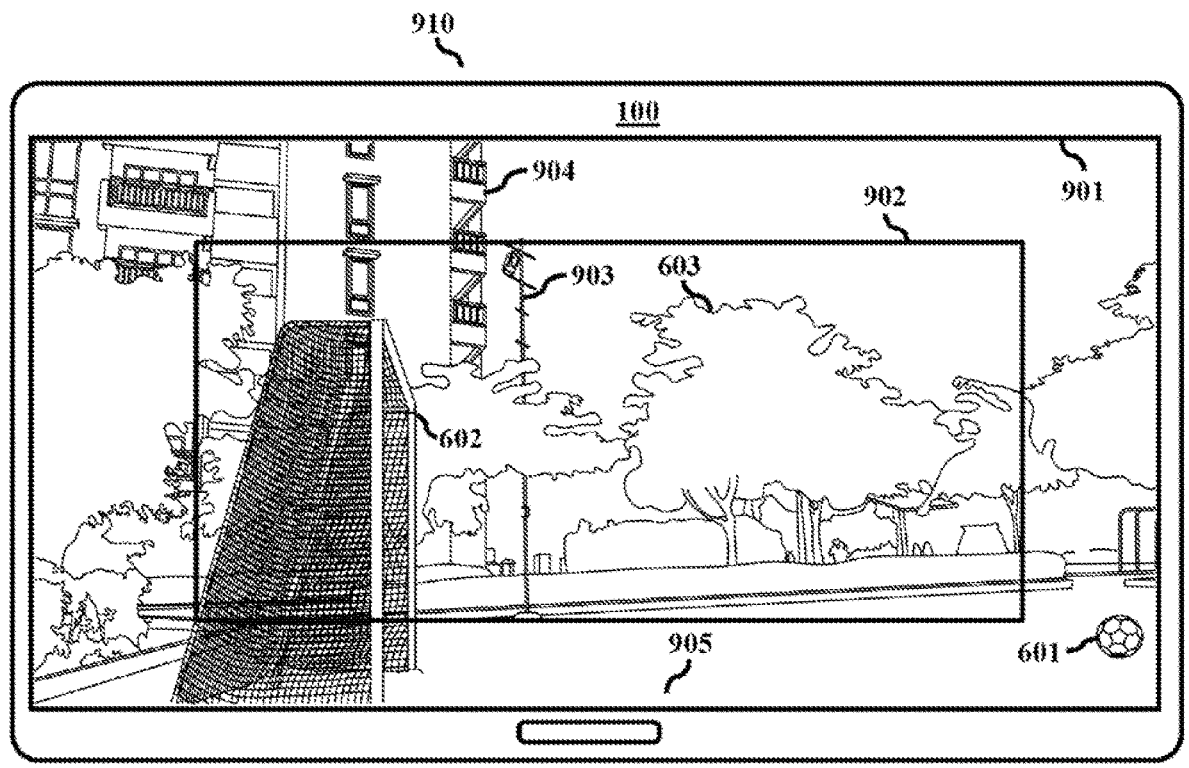
Figure 9D:
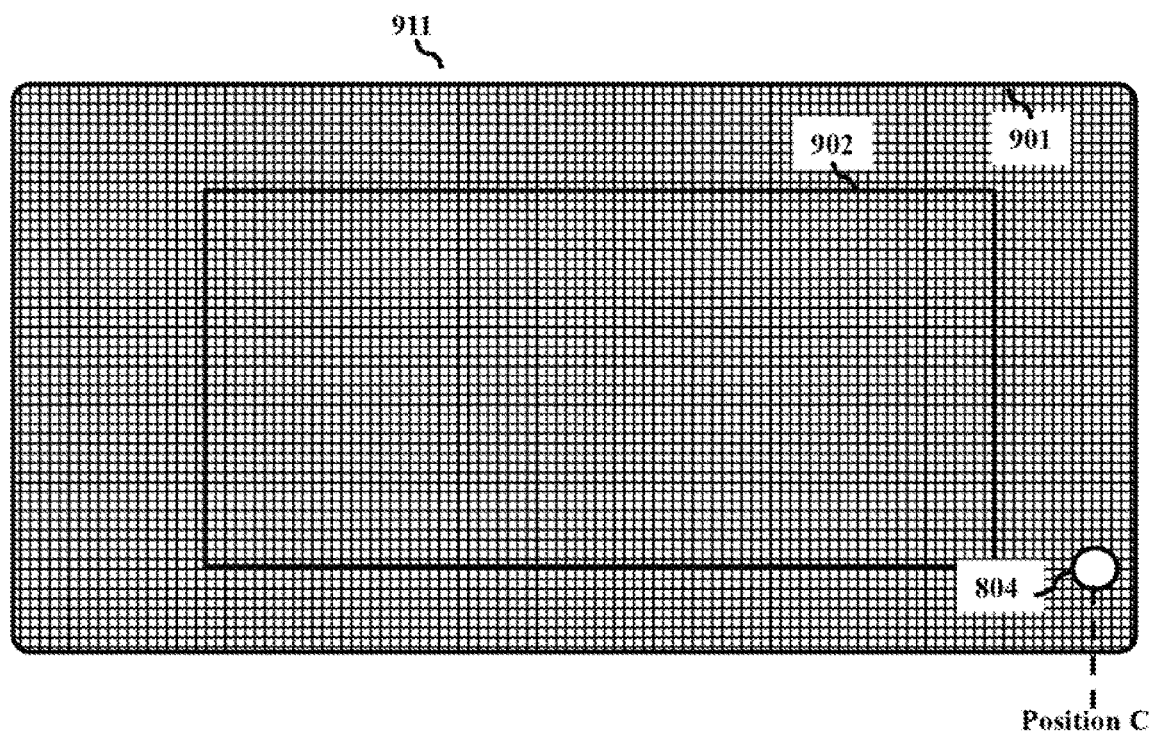

As shown in the FIG. 9B, from the first image frame 906 of the UW image sensor 140B onwards, the electronic device 100 divides the image frames into small blocks for generating the respective motion map and represents the moving object, i.e. the ball 601 in the motion map as the white pixel blocks. The white pixel blocks indicate the motion blocks corresponds to the ball 601 in each image frame. At the second image frame 908 of the UW image sensor 140B as shown in the FIG. 9C, the electronic device 100 generates the cluster 804 of the white pixel blocks and classifies the cluster 804 as a single object. Since, the center of the object is moving over time, the electronic device 100 considers the ball 601 as the candidate object to trigger capturing the SSM video. At the third image frame 910 of the UW image sensor 140B as shown in the FIG. 9D, the electronic device 100 notes the position of the center of the object based on the center of the cluster 804 in representation 911.

Figure 9E:
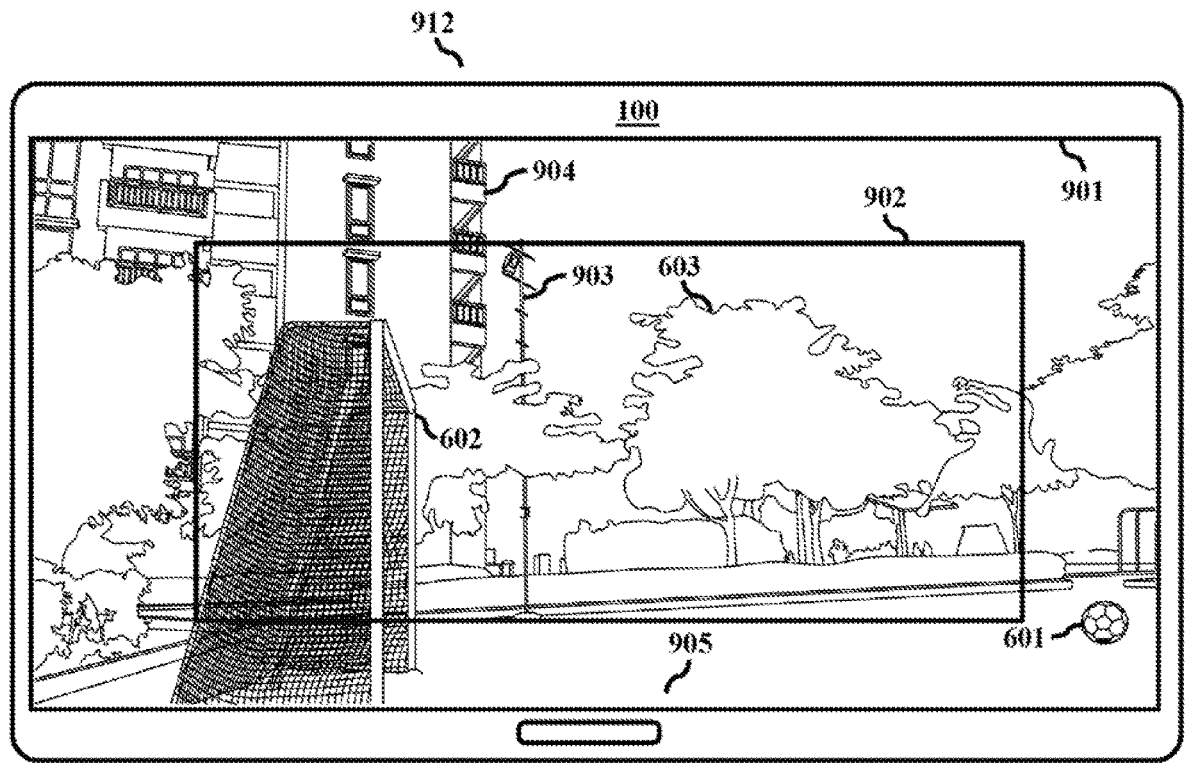
Figure 9E:
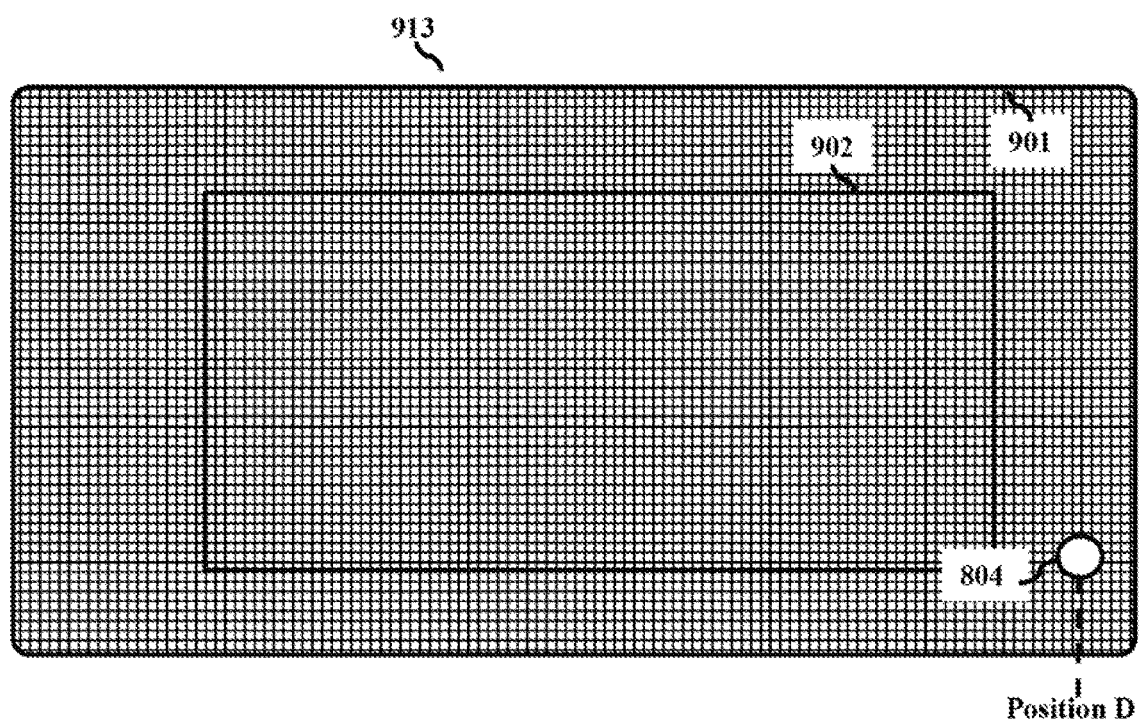
Figure 9F:
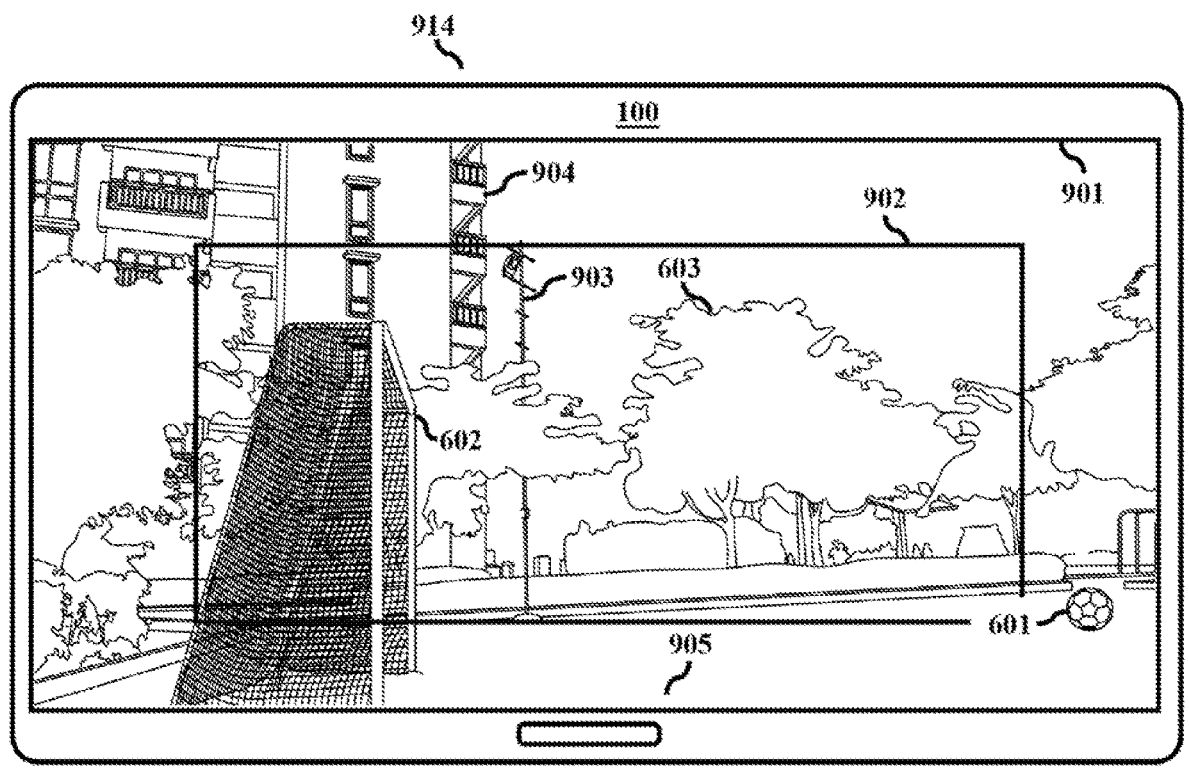
Figure 9F:
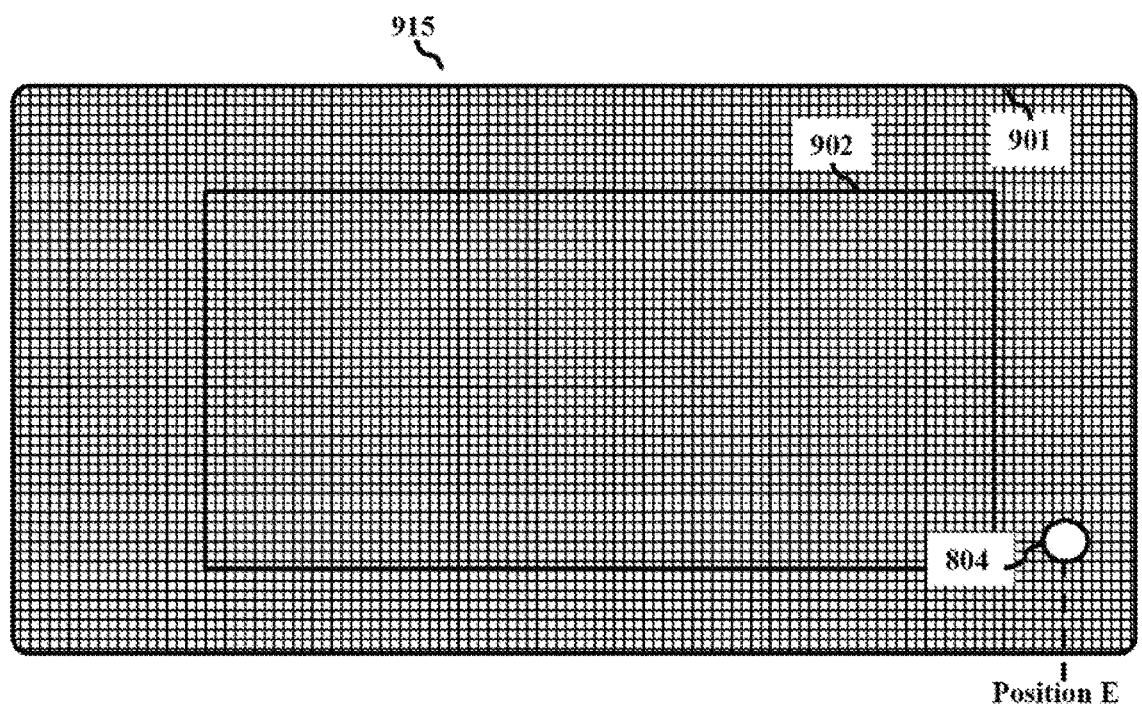
Figure 9G:
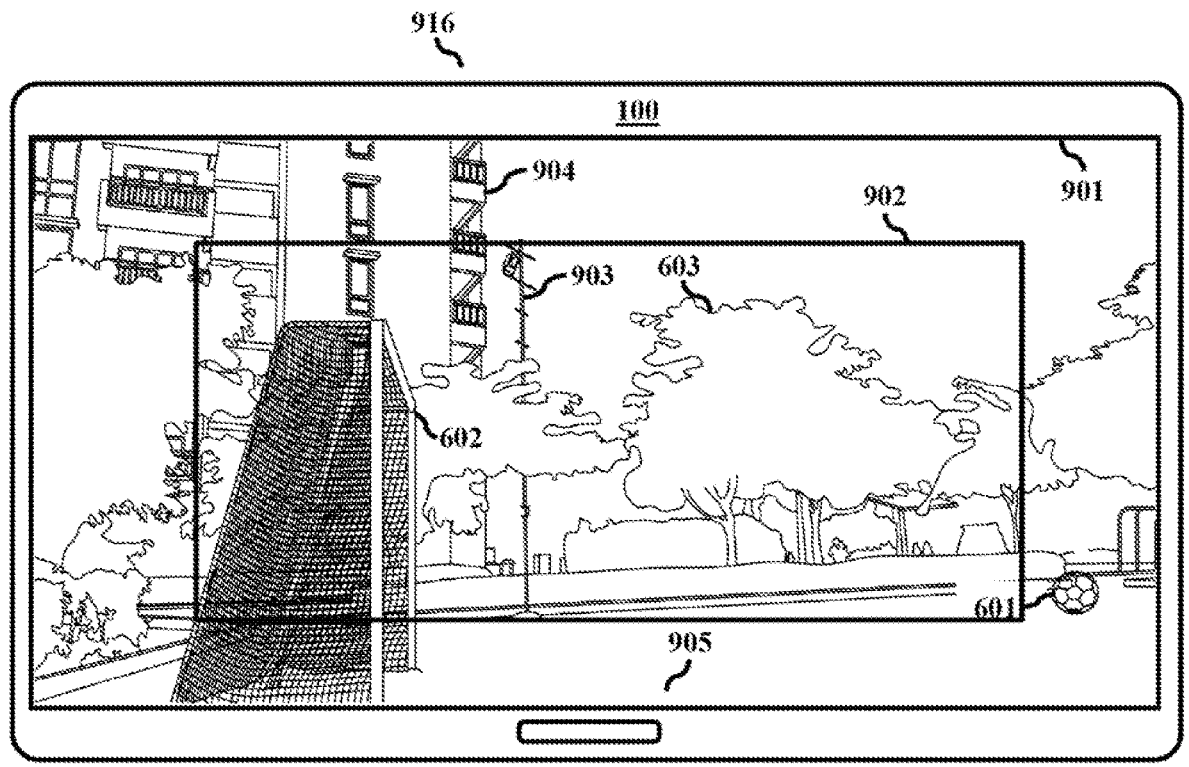
Figure 9G:
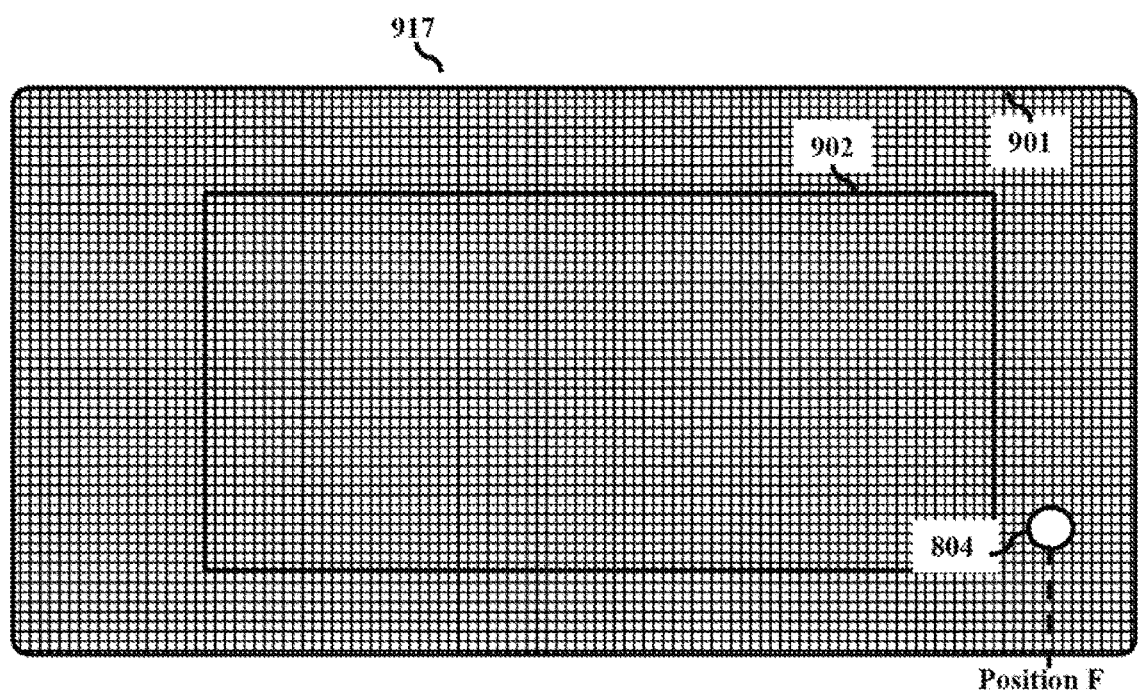

At the fourth image frame of the UW image sensor 140B as shown in the FIG. 9E, the electronic device 100 detects that the object is moving based on the motion of the center of the cluster 804 in representation 913. Further, the electronic device 100 averages the difference between the position of the centres over a few frames (~4 frames) to calculate the pixel speed per frame to know about a portion of the image through which the object is travelling between frames on average. At the fifth image frame 914 of the UW image sensor 140B as shown in the FIG. 9F, the electronic device 100 obtains an information on the position of the object from 2nd, 3rd, 4th, 5th frames based on the position of the center of the cluster 804, and calculates the velocity of the object based on the position information. Further, the electronic device 100 indicates that the object will enter the FOV 902 of the wide image sensor 140A in the 8th frame. At the sixth image frame 916 of the UW image sensor 140B as shown in the FIG. 9G, the electronic device 100 estimates the velocity of the object using the last 3 frames 914, 912, 910 with the current one 916 and predicts a future entry in the ROI (i.e. FOV 902 of the wide image sensor 140A) based on the velocity. Further, the electronic device 100 indicates that the object will enter the FOV 912 of the wide image sensor 140A in the 8th frame 920.

Figure 9H:
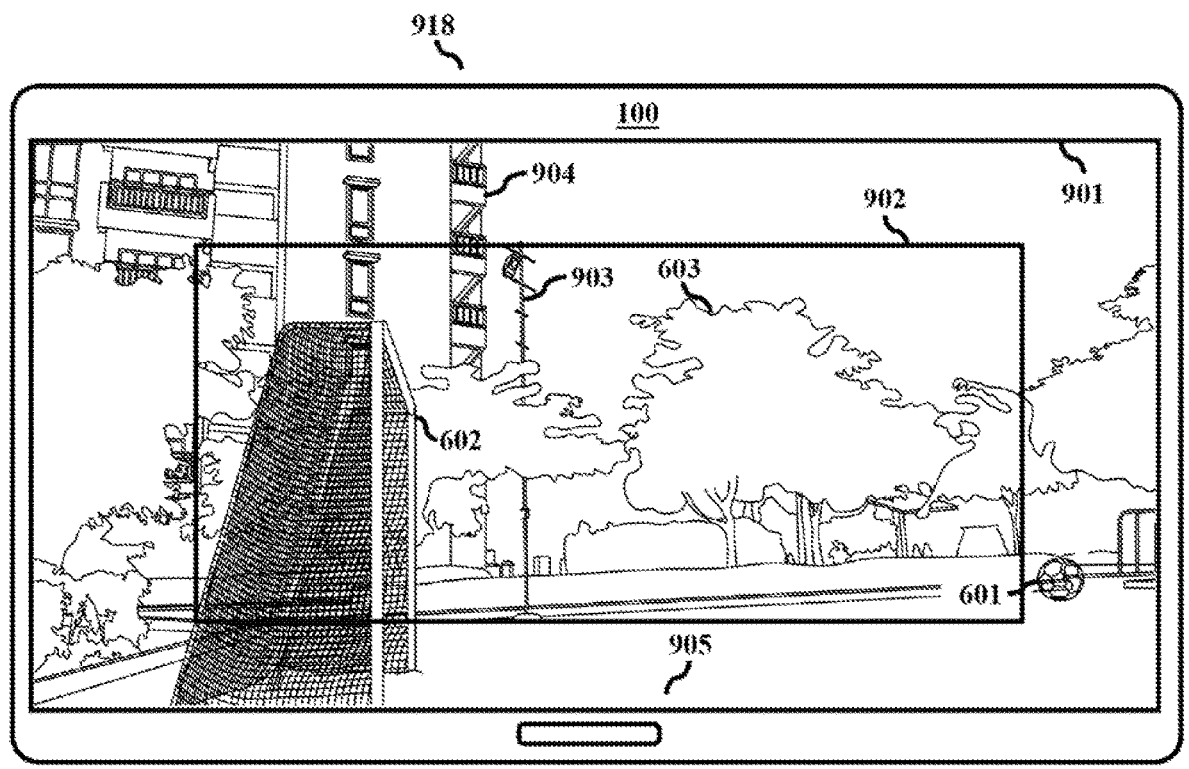
Figure 9H:
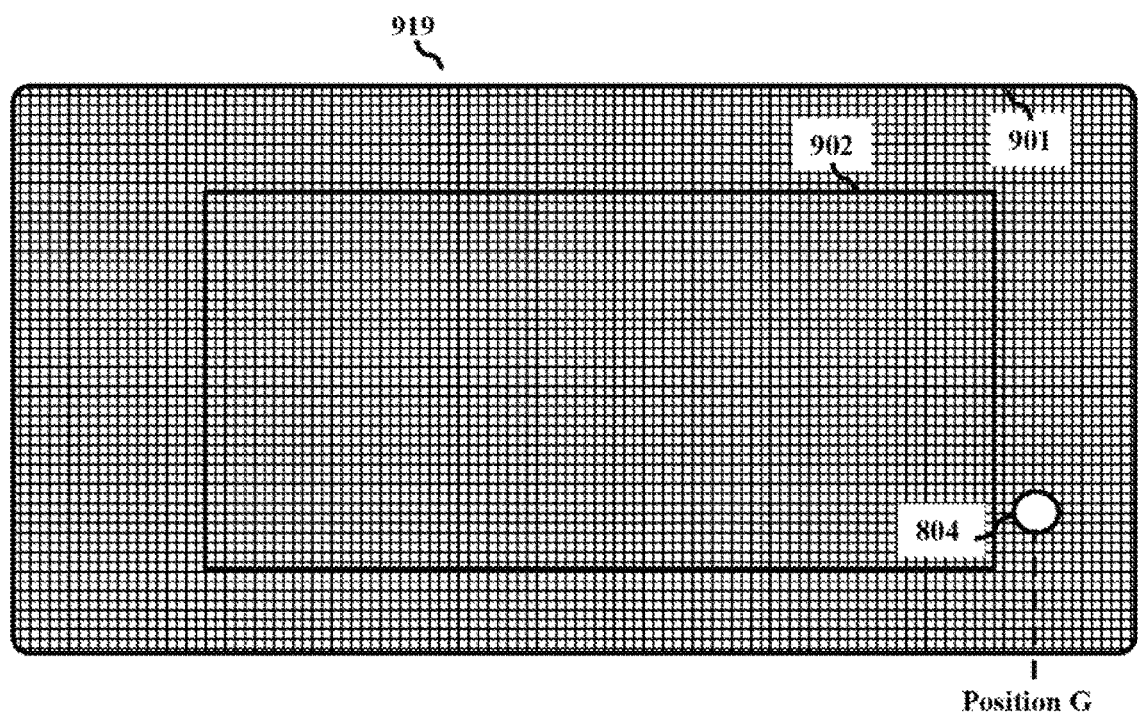
Figure 9I:
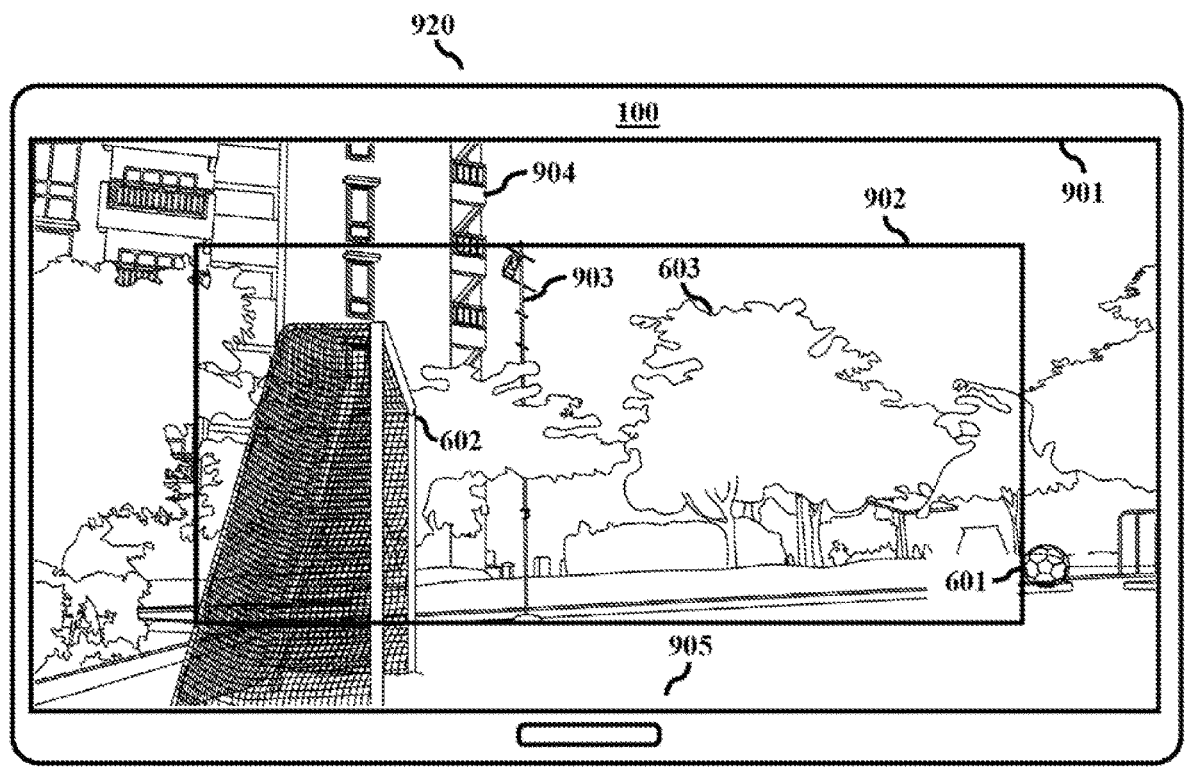
Figure 9I:
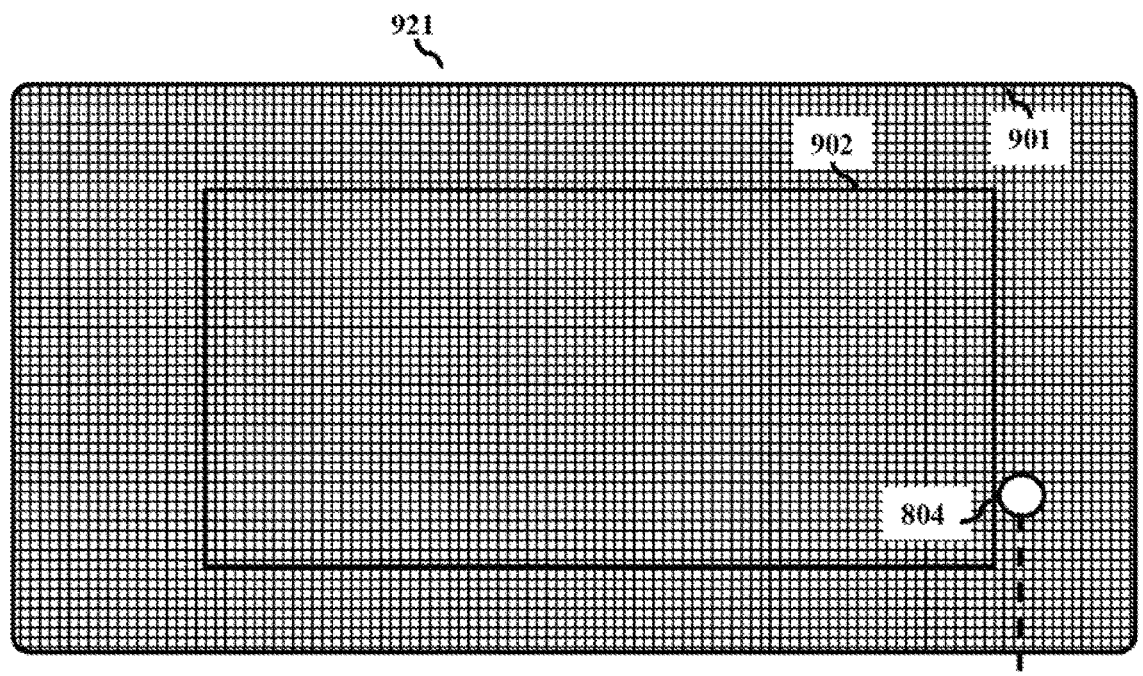

At the seventh image frame 918 of the UW image sensor 140B as shown in the FIG. 9H, the electronic device 100 determines that the ball 601 will enter to the ROI in the next frame 920 based on a knowledge on the position of the object from last 3 frames 916, 914, 912. At the eighth image frame 920 of the UW image sensor 140B as shown in the FIG. 9I, the object enters to the ROI and the electronic device 100 triggers the wide image sensor 140A to capture the image frames from FOV 902 of the wide image sensor 140A.

Figure 10:
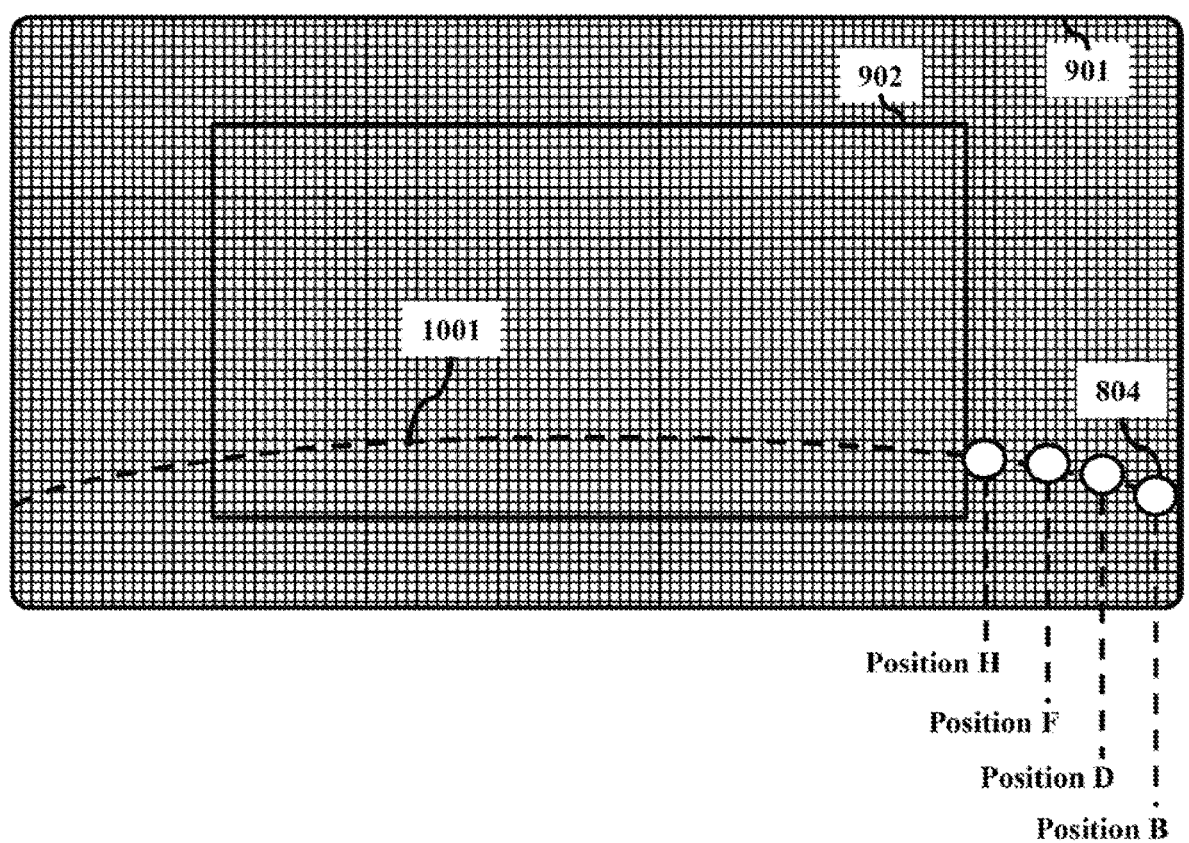
FIG. 10 is an example scenario illustrating a computed trajectory of the movable object, according to an embodiment as disclosed herein.
Figure 11A:
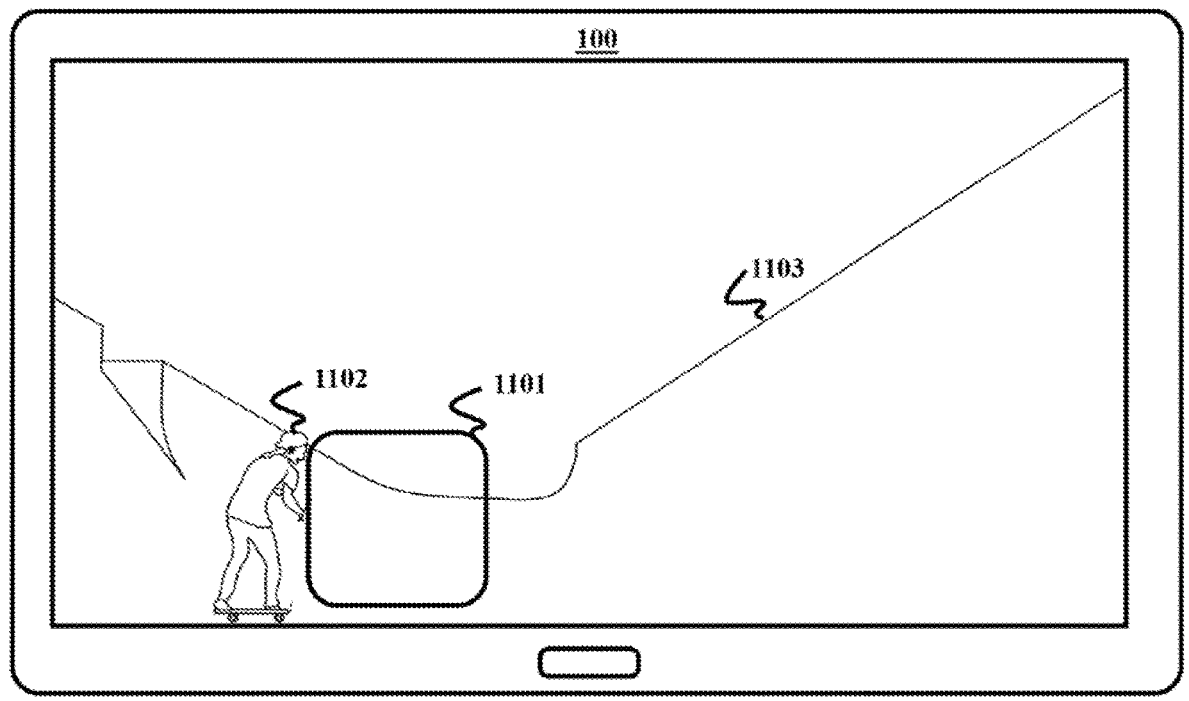
FIGS. 11A-11E is an example scenario illustrating the scene of a skating playground, where the electronic device generates a stitched image of a boy playing skating in the skating playground, according to an embodiment as disclosed herein.
Figure 11B:
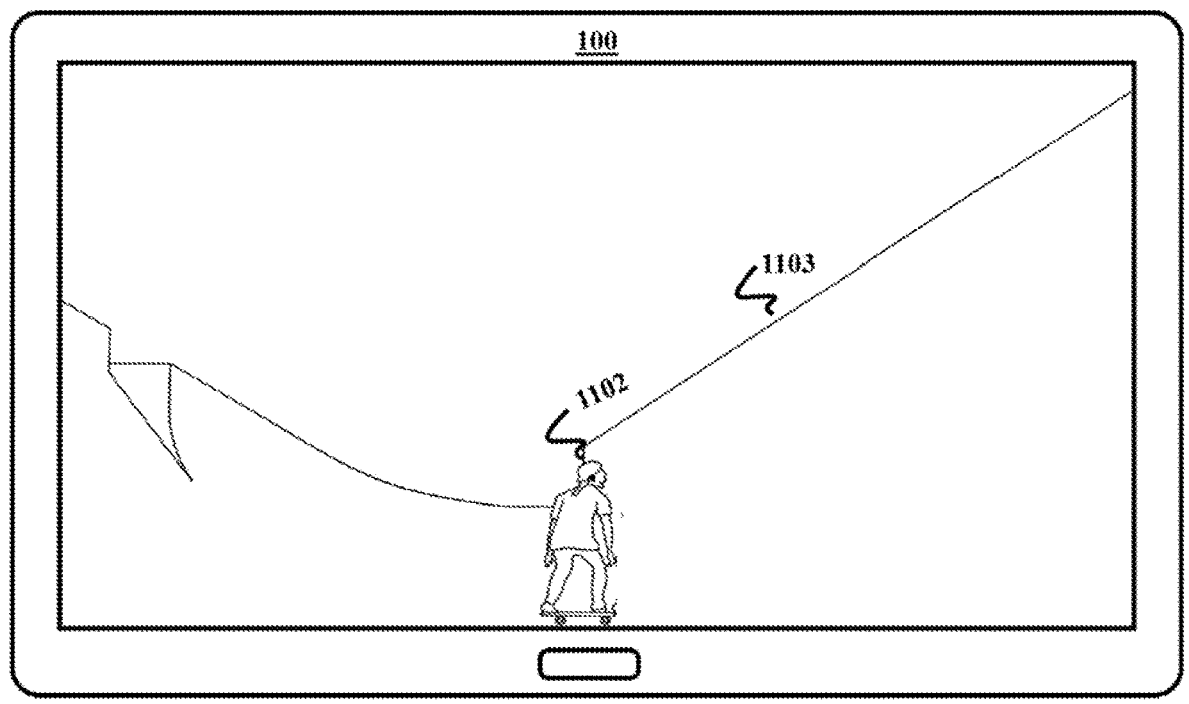
Figure 11C:
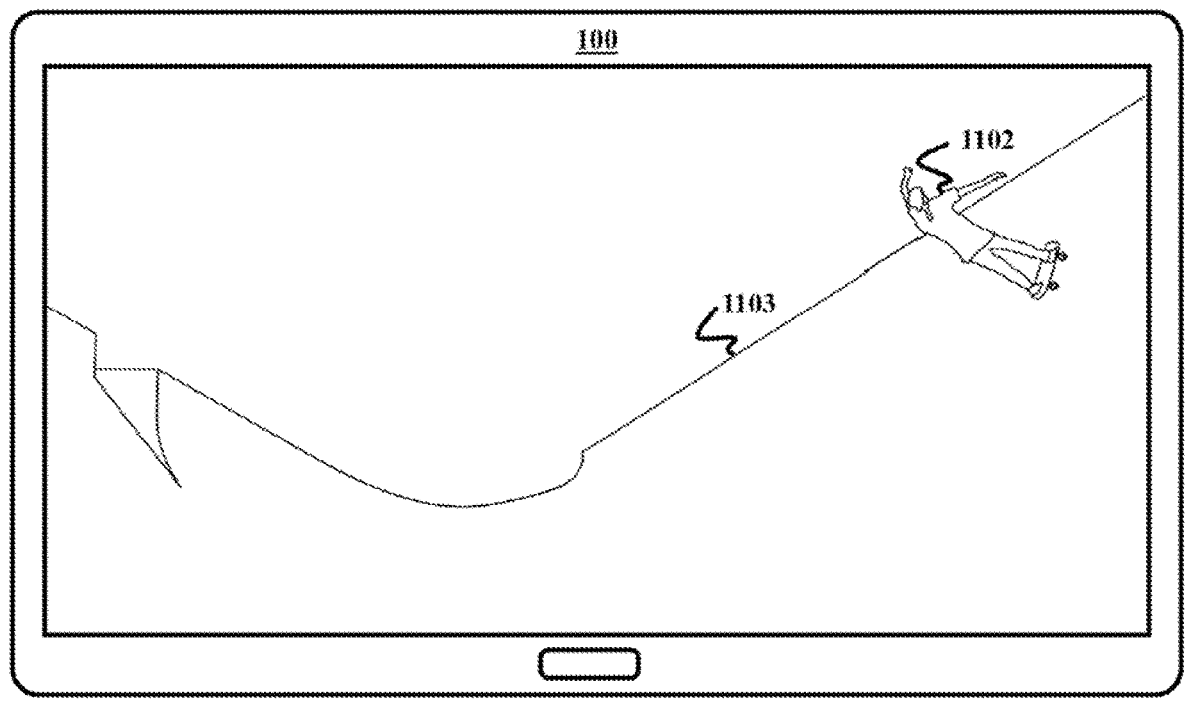
Figure 11D:
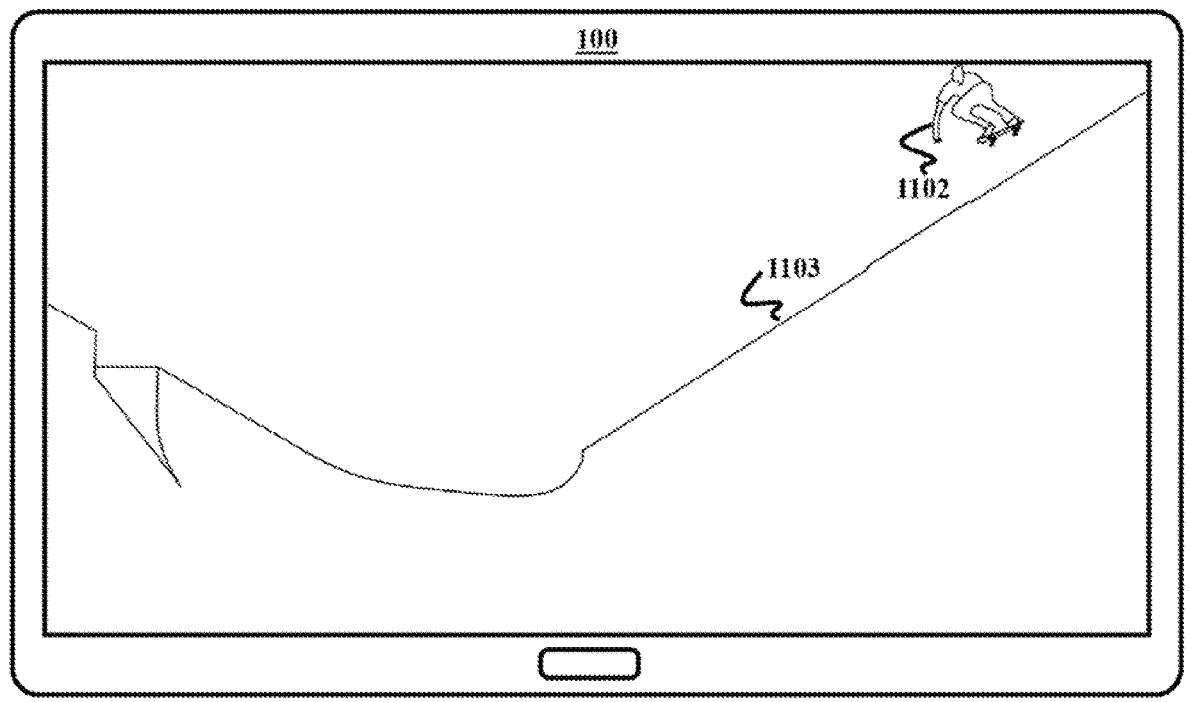
Figure 11E:
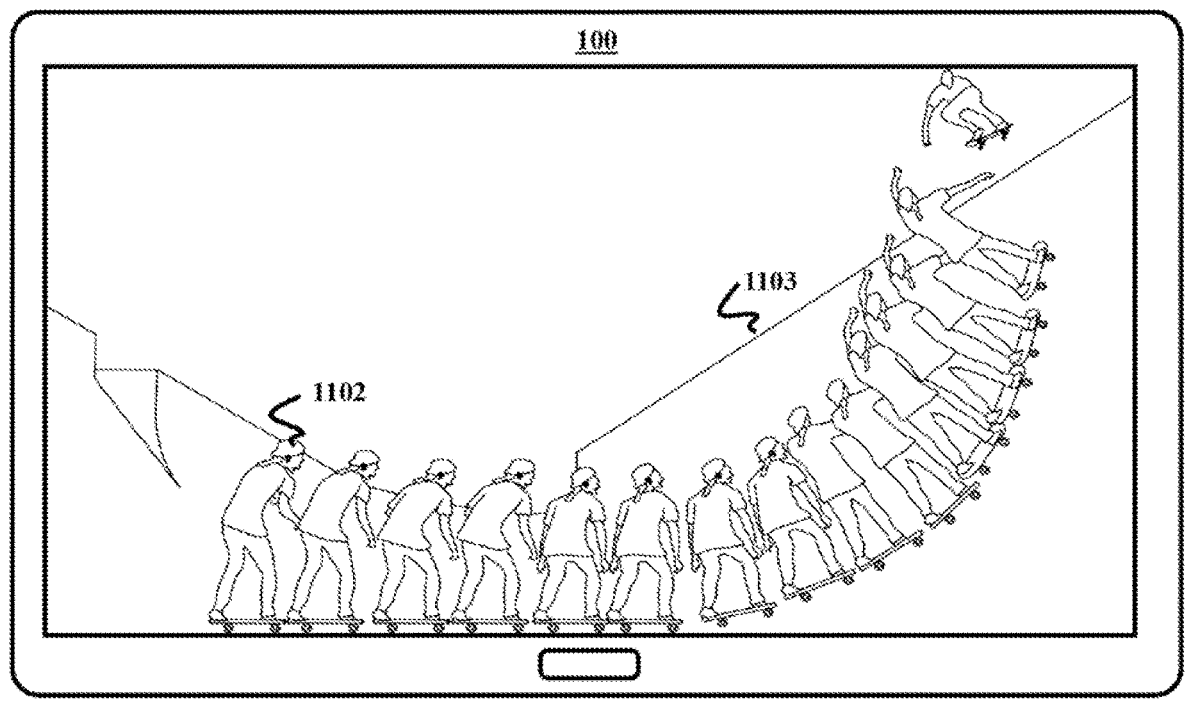
Figure 12A:
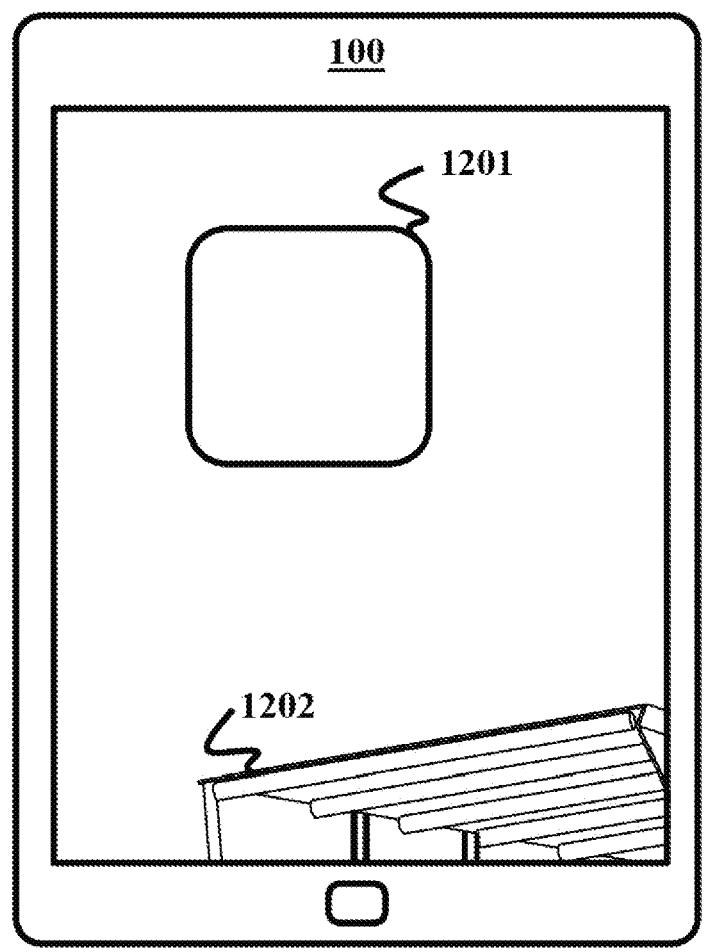
FIGS. 12A-12D is an example scenario illustrating the scene of a skating bench, where the electronic device initiates recording of the SSM video in response to detecting a motion in a region of interest of the image frame of the scene, according to an embodiment as disclosed herein.
Figure 12B:
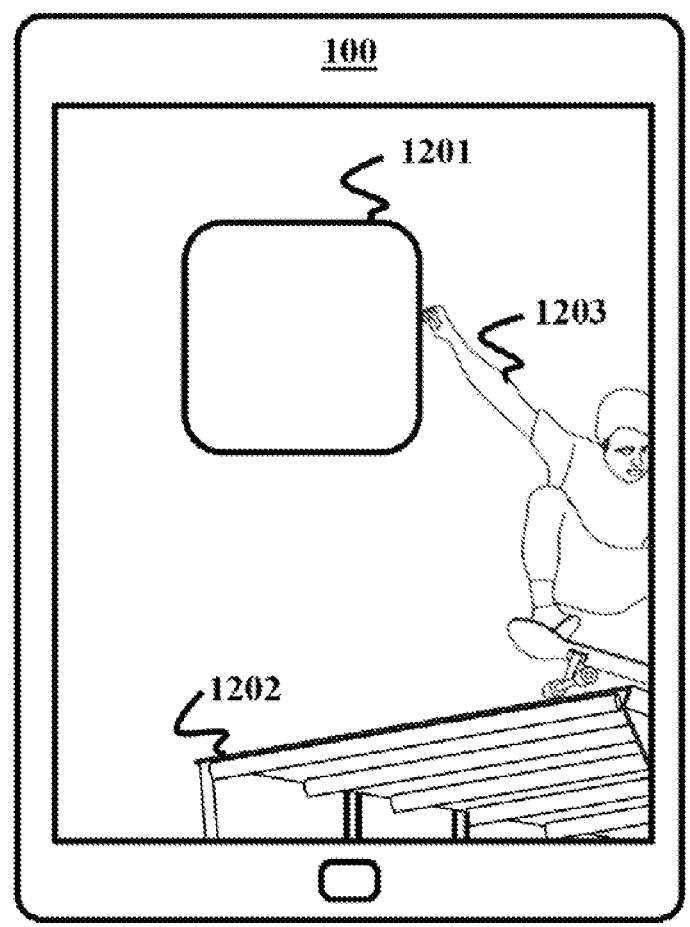
Figure 12C:
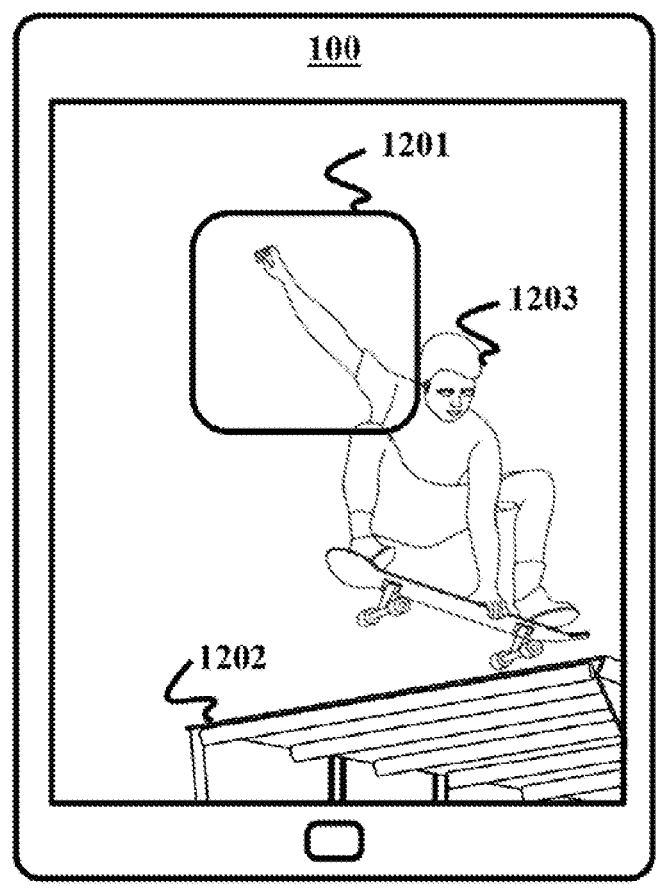
Figure 12D:
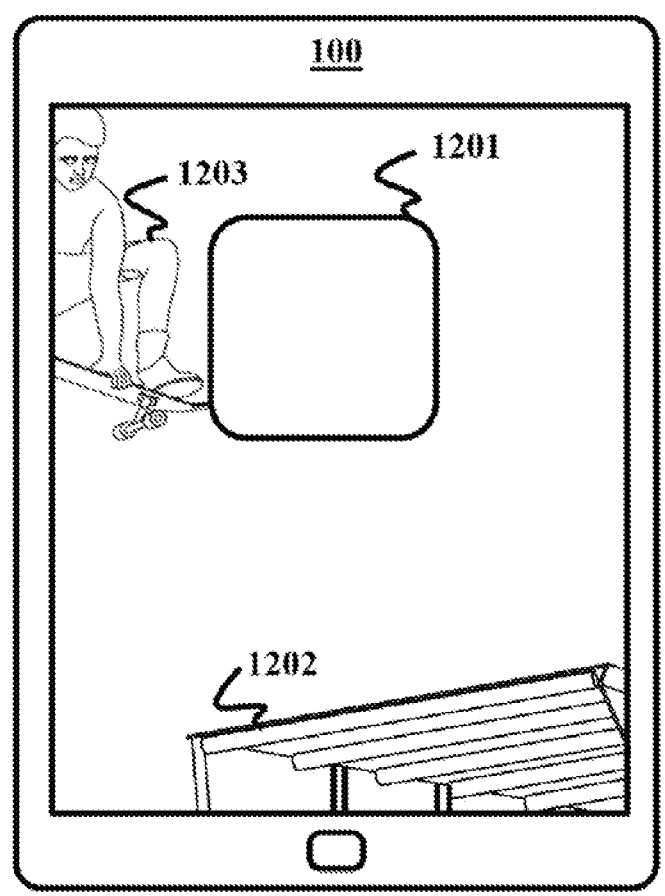

FIG. 10 is an example scenario illustrating a computed trajectory of the movable object, according to an embodiment as disclosed herein. With respect to the example scenario described in the FIGS. 9A-9I, the electronic device 100 superimposes the position of the motion blocks in the image frames 908 (i.e. 2nd image frame), 912 (i.e. 4th image frame), 916 (i.e. 6th image frame), 920 (i.e. 8th image frame) as positions B, D, F, H respectively. Further, the electronic device 100 generates a dashed line 1001 represents the predicted trajectory using positioning and velocity estimation of the centre of the object based on the positions B, D, F, H. Further, the electronic device 100 predicts the frame at which the object crosses the FOV 901 of the UW image sensor 140B or enters to the ROI (i.e. FOV 902) based on the trajectory and the velocity of the object. Further, the electronic device 100 switches the UW image sensor 140B to the wide image sensor 140B for recording SSM video for better quality and viewing experience of the user, in response to reaching to an instant to capture the predict frame.

FIGS. 11A-11E is an example scenario illustrating the scene of a skating playground 1103, where the electronic device 100 generates a stitched image of a boy 1102 playing skating in the skating playground 1103, according to an embodiment as disclosed herein. Consider the scene of the boy 1102 is playing skating on skating playground 1103. The user wants to generate the stitched image of the scene using the electronic device 100. The user marks the ROI 1101 in the preview of the scene displaying by the electronic device 100 as shown in the FIG. 11A. The electronic device 100 analyzes the scene and detects the motion when the boy 1102 starts skating. Consider the boy 1102 reaches the ROI 1102. Further, the electronic device 100 detects the motion at the ROI 1102 and triggers capturing of image of the scene. Further, the electronic device 100 determines the velocity of the boy based on the change in the position of the boy 1102 in certain consecutive image frames. Further, the electronic device 100 determines the number of consecutive image frames to capture and the time period to capture each consecutive frame to generate a stitched image based on the velocity of the boy 1102, the trajectory of motion of the boy 1102 and an area of the FOV. Further, the electronic device 100 triggers to capture 14 more shots of the scene after equal time period. The 5th image captured by the electronic device 100 is shown in the FIG. 11B. The 14th image captured by the electronic device 100 is shown in the FIG. 11C. The 15th image captured by the electronic device 100 is shown in the FIG. 11D. Further, the electronic device 100 generates the stitched image of the scene as shown in the FIG. 11E, by overlaying all the 15 images captured by the electronic device 100.

FIGS. 12A-12D is an example scenario illustrating the scene of a skating bench 1202, where the electronic device 100 initiates recording of the SSM video in response to detecting the motion in the ROI 1201 of the image frame of the scene, according to an embodiment as disclosed herein. Consider, a boy 1203 is playing skating on the skating bench 1202. The user wants to record the SSM video of the scene using the electronic device 100. The user marks the ROI 1201 in the preview of the scene displaying by the electronic device 100 as shown in the FIG. 12A. The electronic device 100 analyzes the scene and detects the motion when the boy 1203 starts the skating as shown in in the FIG. 12B. Consider the boy 1203 reaches the ROI 1202. Further, the electronic device 100 detects the motion at the ROI and triggers capturing of the SSM video of the scene. Further, the electronic device 100 continues to record the SSM video as shown in in the FIG. 12C until the motion exists in the ROI 1201 as shown in the FIG. 12D.

Figure 13A:
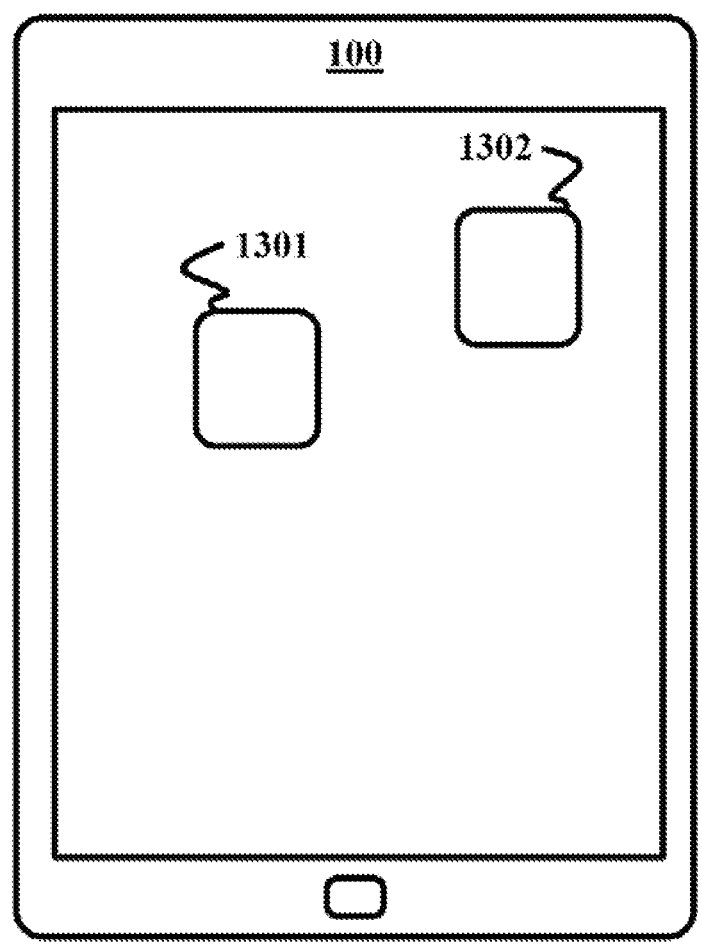
FIGS. 13A-13B is an example scenario illustrating the scene of two boys, where the electronic device captures of the SSM video of the boys in response to detecting the motion on at least one region of interest of the image frame of the scene, according to an embodiment as disclosed herein.
Figure 13B:
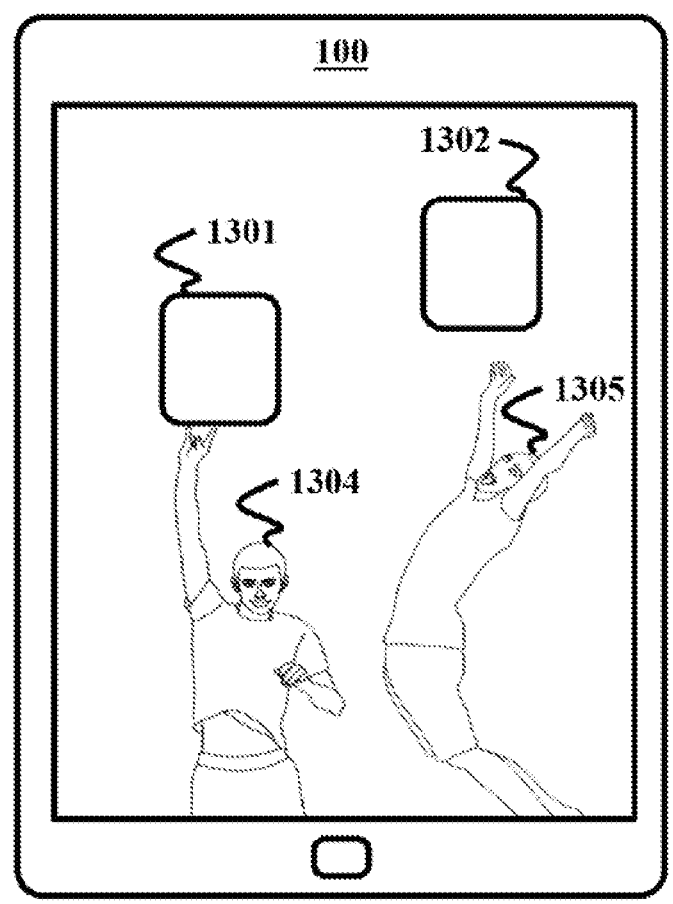

FIGS. 13A-13B is an example scenario illustrating the scene of two boys 1304, 1305, where the electronic device 100 captures of the SSM video of the boys 1304, 1305 in response to detecting the motion on at least one ROI 1301, 1302 of the image frame of the scene, according to an embodiment as disclosed herein. Consider the user wants to record the SSM video of the scene of two boys 1304, 1305 jumping upwards using the electronic device 100. The user marks 2 ROIs 1301, 1302 in the preview of the scene displaying by the electronic device 100 at different positions as shown in FIG. 13A. Consider, the two boys 1304, 1305, jump upwards and a hand of one boy 1304 reaches to the ROI 1301. The electronic device 100 analyzes the scene and detects the motion at the ROI 1301 when the hand of the boy 1304 reaches to the ROI 1301 as shown in FIG. 13B. Further, the electronic device 100 triggers capturing of the SSM video of the scene. Further, the electronic device 100 continues to record the SSM video until the motion exists in least one ROI 1301, 1302.

Figure 14:
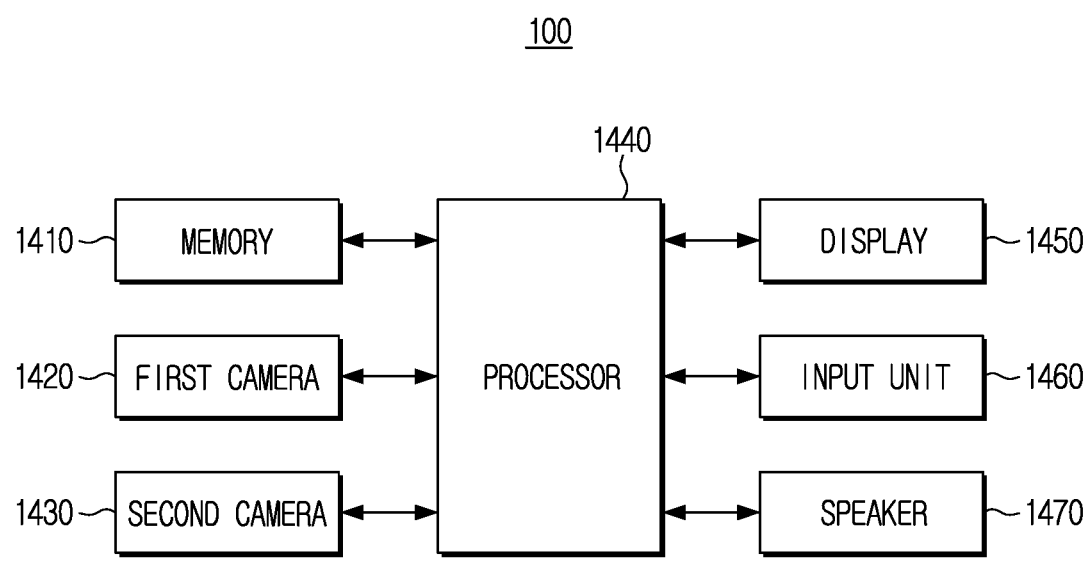
FIG. 14 is a block diagram illustrating configuration of an electronic device according to an embodiment.

According to another embodiment, as illustrated in FIG. 14, the electronic device may include a memory, a first camera 1420, a second camera 1430, a processor 1440, a display 1450, an input unit 1460, and a speaker 1470. However, the components illustrated in FIG. 14 is an exemplary view for implementing embodiments of the present disclosure, and appropriate hardware and software components that are obvious to those skilled in the art may be additionally included in the electronic device 100.

The memory 1410, just like the memory 120 illustrated in FIG. 1, may store instructions or data related to at least one of other components of the electronic device 100. The memory 1410 may is accessed by the processor 1440, and reading/recording/modifying/deleting/updating, etc. of data may be performed by the processor 1440.

In this disclosure, the term 'a memory' may include the memory 1410, a ROM (not shown) inside the processor 1440, a RAM (not shown) or a memory card (not shown) (e.g., a micro SD card, a memory stick) mounted on the electronic device 100. In addition, the memory 1440 may store programs, data, etc. for configuring various screens to be displayed on a display area. The specific description regarding the memory 1410 has been provided in detail with reference to the memory 120 of FIG. 1 and thus, overlapping description will be omitted.

The first camera 1420 includes a first image sensor 140A, and is configured to obtain one or more image frames by photographing surroundings of the electronic device 100. The first camera 1420 may obtain an image obtaining a plurality of image frames by photographing surroundings of the electronic device 100. Here, the image may include a live-view image.

The second camera 1430 includes a second image sensor 140B, and is configured to obtain one or more image frames by photographing surroundings of the electronic device 100. The second camera 1430 may obtain an image obtaining a plurality of image frames by photographing surroundings of the electronic device 100. Here, the image may include a live-view image.

The processor 1440 is a component in which the SSM video controller 110 and the processor 130 illustrated in FIG. 1 are merged into one component. In other words, as illustrated I FIG. 14, the SSM video controller 110 and the processor 130 may be implemented in a form where they are merged into one processor 1440. However, this is only an example, and the SSM video controller 110 and the processor 130 may be implemented as separate components as illustrated in FIG. 1.

The processor 1440 may be electrically connected to the memory 1410 to control the overall functions and operations of the electronic device 100. The processor 1440 may obtain a plurality of image frames by photographing surroundings of the electronic device 100 through the first camera 1420. In this case, the area that can be photographed through the first camera 1420 may mean an area included in a field of view of the first image sensor 140A included in the first camera 1420. The processor 1440 may store the obtained plurality of image frames in a buffer of the memory 1410. However, the buffer may be implemented as a component separate from the memory 1410.

The processor 1440 may set a region of interest (ROI) in each of a plurality of image frames. For example, the processor 1440 may control the display 1450 to display an image consisting of a plurality of image frames obtained through the first camera 1420. If a user touch for setting an ROI on a part of the display 1450 including a touch screen is input, the processor 1440 may set the area where the touch is input as an ROI. In another example, the processor 1440 may set an ROI on the plurality of image frames using an auto focus method.

The processor 1440 may obtain a motion identification map (or a confidence map) corresponding to each of the plurality of image frames. Here, the motion identification map may be generated based on motion data detected from each of the plurality of image frames.

Specifically, the processor 1440 may divide each of the plurality of image frames into a plurality of segments, and detect motion data from each of the plurality of segments of each of the plurality of image frames. The processor 1440 may obtain a motion identification map regarding each of the plurality of image frames by calculating an average of the motion data detected from each of the plurality of segments of each of the plurality of image frames.

Meanwhile, the processor 1440 may identify whether the electronic device 100 moves beyond a predetermined range while the plurality of image frames are obtained through the first camera 1420 based on metadata related to the plurality of image frames. For example, the processor 1440 may identify whether the electronic device 100 moves beyond a predetermined range due to a global motion such as handshaking. In other words, the processor 1440 may identify whether the global motion affects the plurality of image frames.

If it is determined that the electronic device 100 moves beyond a predetermined range, the processor 1440 may delete the plurality of image frames stored in a buffer. Subsequently, the processor 1440 may identify whether the electronic device 100 moves beyond the predetermined range while obtaining an image frame obtained the plurality of image frames. Meanwhile, if it is identified that the electronic device 100 does not move beyond the predetermined range, the processor 1440 may obtain a motion identification map by dividing each of the plurality of image frames into a plurality of segments.

The processor 1440 may compare the motion identification map corresponding to each of the plurality of image frames with a motion threshold value (or a fair confidence threshold value). The processor 1440 may identify image frames corresponding to a motion identification map that satisfies the motion threshold value from among the plurality of image frames, and select at least one image frame from among the identified image frames. Meanwhile, since the process of determining a motion threshold value (or a fair confidence threshold value) has been described above, overlapping description will be omitted.

The processor 1440 may obtain information regarding an object included on the selected at least one frame by inputting the at least one frame selected based on the motion identification map to an artificial intelligence model trained to recognize an object. Here, the information regarding an object may include at least one of a type, a size, a shape, etc. of the object.

The processor 1440 may categorize an object as one of a movable object or a static object based on the obtained information regarding the object. The process where the processor 1440 classifies an object as a movable object or a static object has been described above and thus, overlapping description will be omitted.

If the object is classified as a movable object, the processor 1440 may assign the identified movable object as a candidate object. The processor 1440 may identify whether there is a motion of the candidate object on the ROI of the selected at least one frame. The processor 1440 may perform an SSM function through the first camera 1420 according to whether there is a motion of the candidate object on the ROI. Performing the SSM function may mean that the function for recording SSM video is triggered to start high-speed photographing.

Specifically, the processor 1440 may obtain information regarding at least one of a speed or a motion trajectory of the candidate object by inputting the candidate object to a statistical model. The processor 1440 may identify (or monitor) whether there is a motion of the candidate object on the ROI using the obtained information regarding at least one of a speed or a motion trajectory of the candidate object. The process where the processor 1440 obtains information regarding at least one of a speed or a motion trajectory of the candidate object has been described above and thus, overlapping description will be omitted.

If it is identified that there is a motion of an object in at least one ROI, the processor 1440 may perform the SSM function using the first camera 1420. If it is identified that there is no motion of an object in at least one ROI within a predetermined time, the processor 1440 may identify whether to perform the SSM function based on image frames obtained after the plurality of image frames stored in the buffer.

In another example, if it is identified that there is a motion of an object in at least one ROI, the processor 1440 may switch from the first camera 1420 to the second camera 1430, and perform the SSM function through the second camera. In this case, a field of view (FOV) of the second image sensor included in the second camera 1430 may be wider than a FOV of the first image sensor included in the first camera 1420.

The display 1450 may display various information under the control of the processor 1440, just like the display 180 in FIG. 4A. The display 1450, for example, may be implemented as a liquid crystal display (LCD), a light emitting diode (LED) display, an organic light-emitting diode (OLED) display, a quantum dot light-emitting diodes (QLED) display, a microelectromechanical systems (MEMS) display, etc.

The display 1450 may be implemented as a depth-aware display such as a multi-focus display. The display 1450 may display various contents (e.g., texts, images, videos, icons or symbols). In particular, the display 1450 may display an image (or a live view) including a plurality of image frames obtained through the first camera 1420 or the second camera 1430.

The display 1450 may include a touch screen, and may receive a touch, a gesture, an approach or a hovering input using an electronic pen or a user's body part. In addition, the display 1450 may be implemented as a flexible display.

The input unit includes a circuit, and may receive a user input for controlling the electronic device 100. In particular, the input unit 1460 may include a touch panel for receiving a user's touch using a user's hand, a stylus pen, etc., a button for receiving a user's manipulation, etc. In another example, the input unit 1460 may be implemented as another input device (e.g., a keyboard, a mouse, a motion input unit, etc.). Meanwhile, the input unit 1460 may receive first input data input from a user or various user commands. In particular, the input unit 1460 may receive a user command to set an ROI on an image frame.

The speaker 1470 is configured to output various audio data for which various processing such as decoding, amplification, and noise filtering is performed by an audio processor (not illustrated). In addition, the speaker 1470 may output various alarm sounds or voice messages. For example, the speaker 160 may perform an alarm sound indicating that the SSM function is performed or an alarm sound indicating that the first camera 1420 is switched to the second camera 1430.

Figure 15:
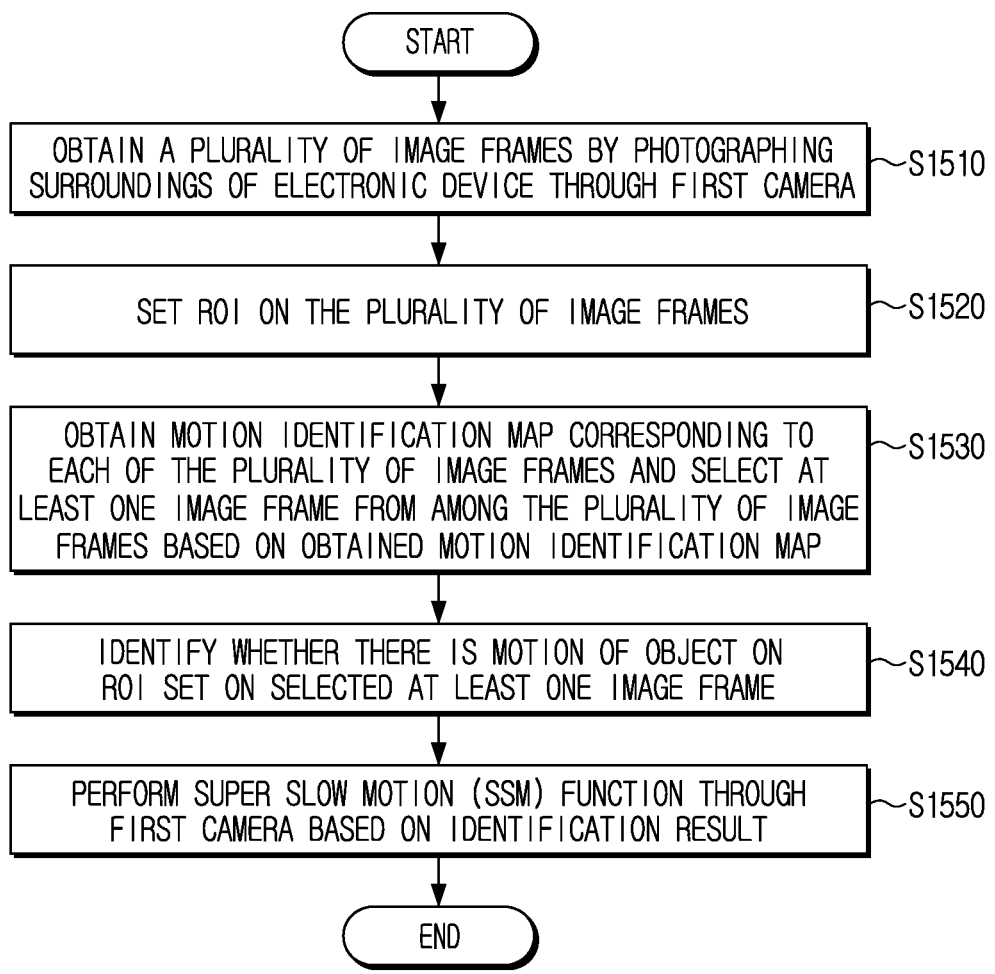
FIG. 15 is a view provided to explain a controlling method of an electronic device according to an embodiment.

FIG. 15 is a view provided to explain a controlling method of the electronic device 100 according to an embodiment.

The electronic apparatus 100 may obtain a plurality of image frames by photographing surroundings of the electronic device 100 through the first camera (S1510). In this case, the area that can be photographed through the first camera may mean the area included in a field of view of the first image sensor included in the first camera.

The electronic device 100 may set an ROI on the plurality of image frames (S1520). For example, the electronic device 100 may display an image (or a scene) consisting of the plurality of image frames. The electronic device 100 may receive a user input (e.g., a user touch, etc.) for setting part of the displayed image as an ROI. In another example, the electronic device 100 may set an area including a specific object as an ROI using an auto focus function.

The electronic device 100 may obtain a motion identification map corresponding to each of the plurality of image frames, and select at least one image frame from among the plurality of image frames based on the obtained motion identification map (S1530).

Specifically, the electronic device 100 may divide each of the plurality of image frames into a plurality of segments, and detect motion data from each of the plurality of segments of each of the plurality of image frames. The electronic device 100 may obtain a motion identification map regarding each of the plurality of image frames by calculating an average of the motion data detected from each of the plurality of segments of each of the plurality of image frames.

In addition, the electronic device 100 may compare the motion identification map corresponding to each of the plurality of image frames with a motion threshold value. The electronic device 100 may identify image frames corresponding to the motion identification map that satisfies the motion threshold value from among the plurality of image frames and select at least one image frame from among the identified image frames.

The electronic device 100 may identify whether there is a motion of an object on the ROI set on the selected at least one image frame (S1540). Specifically, the electronic device 100 may obtain information regarding the object included on the selected at least one frame by inputting the selected at least one frame to an artificial intelligence model trained to recognize an object. The electronic device 100 may classify the object as a movable object or a static object based on the obtained information regarding the object, and assign the object classified as the movable object as a candidate object. In addition, the electronic device 100 may identify whether there is a motion of the candidate object on the ROI.

The electronic device 100 may perform the SSM function through the first camera based on a result of the identification. For example, if it is identified that there is a motion of the object in at least one ROI, the electronic device 100 may perform the SSM function using the first camera. In another example, if it is identified that there is no motion of the object in at least one ROI within a predetermined time, the electronic device 100 may identify whether to perform the SSM function based on the image frame obtained through the first camera after the plurality of image frames. In other words, the electronic device 100 may repeat the above-described processing operation in relation to the image frame obtained through the first camera after the plurality of image frames.

The diverse embodiments of the disclosure may be implemented by software including instructions that are stored in machine (e.g., a computer)-readable storage media. The machine is a device that invokes the stored instructions from the storage medium and is operable according to the called instruction, and may include the electronic device (e.g., the electronic device 100) according to the disclosed embodiments. When the instructions are executed by the processor, the processor may perform functions corresponding to the instructions, either directly or using other components under the control of the processor. The instructions may include codes generated or executed by a compiler or an interpreter. The machine-readable storage medium may be provided in the form of non-transitory storage medium. Here, the term 'non-transitory storage medium' means that it does not contain a signal and is tangible, but does not distinguish between semi-permanent or temporary storage of data in the storage medium. For example, the 'non-transitory storage medium' may include a buffer in which the data is temporarily stored.

According to an embodiment, the method according to the diverse embodiments disclosed in the disclosure may be included in a computer program product and provided. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In the case of the online distribution, at least a portion of the computer program product (e.g., a downloadable app) may be at least temporarily stored in a storage medium such as a memory of a server of a manufacturer, a server of an application store, or a relay server, or may be temporarily generated.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other components according to the diverse embodiments may be performed in a sequential, parallel, iterative, or heuristic manner, or at least some operations may be executed in a different order or omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the scope of the disclosure as disclosed in the accompanying claims. Such modifications should not be individually understood from the technical spirit or the prospect of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. An electronic device comprising:
   a first camera including a first image sensor; and
   at least one processor configured to:
      obtain a plurality of image frames by photographing through the first camera,
      set a region of interest (ROI) on each image frame of the plurality of image frames,
      obtain a plurality of motion identification maps corresponding respectively to the plurality of image frames, based on motion data detected in the plurality of image frames,
      select at least one image frame from among the plurality of image frames based on the obtained plurality of motion identification maps,
      identify whether there is a motion of an object in the ROI set on the selected at least one image frame, and
      perform a Super Slow Motion (SSM) function through the first camera based on a result of the identifying.

2. The electronic device as claimed in claim 1, wherein the at least one processor is configured to, for each image frame of the plurality of image frames:
   divide the image frame into a plurality of segments,
   detect motion data in each segment of the plurality of segments of the image frame, and
   obtain the motion identification map corresponding to the image frame by calculating an average of the motion data detected in each segment of the plurality of segments of the image frame.

3. The electronic device as claimed in claim 1, wherein the at least one processor is configured to:
   identify whether the electronic device moves beyond a predetermined range while obtaining the plurality of image frames based on metadata related to the plurality of image frames,
   based on identifying that the electronic device moves beyond the predetermined range, delete the plurality of image frames, and
   based on identifying that the electronic device does not move beyond the predetermined range,
   for each image frame of the plurality of image frames,
      divide the image frame into a plurality of segments,
      detect motion data in each segment of the plurality of segments of the image frame, and
      obtain the motion identification map corresponding to the image frame by calculating an average of the motion data detected in each segment of the plurality of segments of the image frame.

4. The electronic device as claimed in claim 3, wherein the metadata related to the plurality of image frames include at least one of a value indicating a stabilization degree of the plurality of image frames or an inertial sensor value generated while the plurality of image frames are obtained.

5. The electronic device as claimed in claim 1, wherein the at least one processor is configured to:
   compare each motion identification map of the plurality of motion identification maps with a motion threshold value,
   identify image frames of the plurality of image frames corresponding to a motion identification map of the plurality of motion identification maps satisfying the motion threshold value, and
   select at least one image frame from among the identified image frames.

6. The electronic device as claimed in claim 5, wherein the at least one processor is configured to:
   average motion data of a segment in each image frame of the plurality of image frames for a predetermined duration, and
   determine the motion threshold value based on a type of an image included in the plurality of image frames and the average of the motion data.

7. The electronic device as claimed in claim 1, wherein the at least one processor is configured to:
   obtain information regarding an object included in the selected at least one image frame by inputting the selected at least one image frame to an artificial intelligence model trained to recognize objects,
   classify the object as a movable object or a static object based on the obtained information regarding the object, and, when the object is classified as a movable object, assign the object classified as a movable object as a candidate object, and
   perform an SSM function through the first camera based on whether there is a motion of the candidate object in the ROI.

8. The electronic device as claimed in claim 7, wherein the at least one processor is configured to:
   obtain information regarding at least one of a speed and a motion trajectory of the candidate object by inputting the candidate object to a statistical model, and
   identify whether there is a motion of the candidate object in the ROI using the obtained information regarding at least one of a speed and a motion trajectory of the candidate object.

9. The electronic device as claimed in claim 1, wherein the at least one processor is configured to:

based on identifying that there is a motion of the object in the ROI, perform the SSM function using the first camera, and based on identifying that there is no motion of the object in the ROI within a predetermined time, identify whether to perform the SSM function using an image frame obtained through the first camera after the plurality of image frames.

10. The electronic device as claimed in claim 1, further comprising:

a second camera including a second image sensor having a field of view (FOV) that is wider than a FOV of the first image sensor, wherein the at least one processor is configured to, based on identifying that there is a motion of the object in the ROI, switch from the first camera to the second camera and perform the SSM function through the second camera.

11. A controlling method of an electronic device that includes a first camera including a first image sensor, the controlling method comprising:

obtaining a plurality of image frames by photographing through the first camera;

setting a region of interest (ROI) on each image frame of the plurality of image frames;

obtaining a plurality of motion identification maps corresponding respectively to the plurality of image frames, based on motion data detected in the plurality of image frames;

selecting at least one image frame from among the plurality of image frames based on the obtained plurality of motion identification maps;

identifying whether there is a motion of an object in the ROI set on the selected at least one image frame; and performing an SSM function through the first camera based on a result of the identifying.

12. The controlling method as claimed in claim 11, wherein the obtaining the plurality of motion identification maps comprises, for each image frame of the plurality of image frames:

dividing the image frame into a plurality of segments, detecting motion data in each segment of the plurality of segments of the image frame, and obtaining the motion identification map corresponding to the image frame by calculating an average of the motion data detected in each segment of the plurality of segments of the image frame.

13. The controlling method as claimed in claim 11, wherein the obtaining the plurality of motion identification maps comprises:

identifying whether the electronic device moves beyond a predetermined range while obtaining the plurality of image frames based on metadata related to the plurality of image frames, based on identifying that the electronic device moves beyond the predetermined range, deleting the plurality of image frames, and based on identifying that the electronic device does not move beyond the predetermined range, for each image frame of the plurality of image frames, dividing the image frame into a plurality of segments, detecting motion data in each segment of the plurality of segments of the image frame, and obtaining the motion identification map corresponding to the image frame by calculating an average of the motion data detected in each segment of the plurality of segments of the image frame.

14. The controlling method as claimed in claim 13, wherein the metadata related to the plurality of image frames include at least one of a value indicating a stabilization degree of the plurality of image frames or an inertial sensor value generated while the plurality of image frames are obtained.

15. The controlling method as claimed in claim 11, wherein the selecting comprises:

comparing each motion identification map of the plurality of motion identification maps with a motion threshold value, identifying image frames of the plurality of image frames corresponding to a motion identification map of the plurality of motion identification maps satisfying the motion threshold value, and selecting at least one image frame from among the identified image frames.

16. The controlling method as claimed in claim 15, further comprising:

averaging motion data of a segment in each image frame of the plurality of image frames for a predetermined duration; and determining the motion threshold value based on a type of an image included in the plurality of image frames and the average of the motion data.

17. The controlling method as claimed in claim 11, wherein the identifying whether there is a motion of an object in the ROI comprises:

obtaining information regarding an object included in the selected at least one image frame by inputting the selected at least one image frame to an artificial intelligence model trained to recognize objects, classifying the object as a movable object or a static object based on the obtained information regarding the object, and, when the object is classified as a movable object, assigning the object classified as a movable object as a candidate object, and performing an SSM function through the first camera based on whether there is a motion of the candidate object in the ROI.

18. The controlling method as claimed in claim 17, wherein the identifying whether there is a motion of an object in the ROI comprises:

obtaining information regarding at least one of a speed and a motion trajectory of the candidate object by inputting the candidate object to a statistical model, and identifying whether there is a motion of the candidate object in the ROI using the obtained information regarding at least one of a speed and a motion trajectory of the candidate object.

19. The controlling method as claimed in claim 11, wherein the performing an SSM function comprises:

based on identifying that there is a motion of the object in the ROI, performing the SSM function using the first camera, and based on identifying that there is no motion of the object in the ROI within a predetermined time, identifying whether to perform the SSM function using an image frame obtained through the first camera after the plurality of image frames.

20. The controlling method as claimed in claim 11, wherein the performing an SSM function comprises, based on identifying that there is a motion of the object in the ROI, switching from the first camera to a second camera including a second image sensor having a field of view (FOV) that is wider than a FOV of the first image sensor, and performing the SSM function through the second camera.

* * * * *